(12) United States Patent
Durai et al.

(10) Patent No.: US 12,129,122 B2
(45) Date of Patent: Oct. 29, 2024

(54) MODULAR INVENTORY HANDLING SYSTEM AND METHOD

(71) Applicant: HDS Mercury, Inc., Palo Alto, CA (US)

(72) Inventors: Aravind Durai, Long Grove, IL (US); Thomas Vrenios, Irving, TX (US)

(73) Assignee: HDS Mercury, Inc., Palo Alto, CA (US)

( * ) Notice: Subject to any disclaimer, the term of this patent is extended or adjusted under 35 U.S.C. 154(b) by 126 days.

(21) Appl. No.: 17/319,747

(22) Filed: May 13, 2021

(65) Prior Publication Data

US 2021/0354925 A1 Nov. 18, 2021

Related U.S. Application Data

(60) Provisional application No. 63/024,317, filed on May 13, 2020.

(51) Int. Cl.
*B65G 1/137* (2006.01)
*B25J 5/02* (2006.01)
*B65G 1/04* (2006.01)
*B65G 47/90* (2006.01)
*B65G 60/00* (2006.01)

(52) U.S. Cl.
CPC ......... *B65G 1/1378* (2013.01); *B65G 1/0485* (2013.01); *B65G 47/90* (2013.01); *B65G 60/00* (2013.01); *B25J 5/02* (2013.01); *B65G 2203/0208* (2013.01); *B65G 2203/042* (2013.01)

(58) Field of Classification Search
CPC .... B65G 1/1378; B65G 1/0485; B65G 47/90; B65G 60/00; B65G 2203/0208; B65G 2202/042; B25J 5/02
See application file for complete search history.

(56) References Cited

U.S. PATENT DOCUMENTS

| | | | |
|---|---|---|---|
| 3,127,791 A | 4/1964 | Roe | |
| 3,439,765 A | 4/1969 | Keegan | |
| 3,831,786 A * | 8/1974 | Griesenbrock | B66F 9/06 104/246 |
| 4,183,253 A | 1/1980 | Borello | |
| 4,492,504 A | 1/1985 | Hainsworth | |
| 4,508,484 A | 4/1985 | Heiz | |
| 4,746,258 A | 5/1988 | Loomer | |
| 4,818,171 A | 4/1989 | Burkholder | |
| 5,361,481 A | 11/1994 | Lloyd | |
| 5,397,211 A | 3/1995 | Lloyd | |
| 6,327,519 B1 * | 12/2001 | Ostwald | G11B 15/6835 700/214 |
| 7,261,511 B2 | 8/2007 | Felder | |
| 7,329,081 B2 | 2/2008 | Baker | |
| 8,128,064 B2 | 3/2012 | Franzen | |

(Continued)

*Primary Examiner* — Saul Rodriguez
*Assistant Examiner* — Ashley K Romano
(74) *Attorney, Agent, or Firm* — Cherskov Flaynik & Gurda, LLC

(57) ABSTRACT

A system of inventory management is described. It includes at least one container adapted to hold inventory items. A conveyor system is adapted to move the containers to and from pick cells. Each pick cell contains an array of processing locations designed to receive containers and an inventory movement tool such as a robotic arm designed to interact with containers received by the pick cell. The pick cells include at least one buffer shelf for processing items.

18 Claims, 25 Drawing Sheets

(56) References Cited

U.S. PATENT DOCUMENTS

| | | | |
|---|---|---|---|
| 8,403,614 B2 * | 3/2013 | Bastian, II | B65G 1/1375 |
| | | | 414/282 |
| 8,639,382 B1 | 1/2014 | Clark | |
| 8,948,914 B2 | 2/2015 | Zini | |
| 9,056,719 B2 | 6/2015 | Tanahashi | |
| 9,156,614 B2 | 10/2015 | Ono | |
| 9,637,318 B2 | 5/2017 | Messina | |
| 9,950,881 B2 * | 4/2018 | Bastian, II | B65G 67/20 |
| 10,065,798 B2 | 9/2018 | Borders | |
| 10,137,566 B2 * | 11/2018 | Bastian, II | B25J 5/007 |
| 10,351,346 B2 * | 7/2019 | Otto | B66F 9/24 |
| 10,472,172 B2 * | 11/2019 | Goren | B65G 1/1378 |
| 10,513,394 B2 | 12/2019 | Borders | |
| 10,800,617 B2 * | 10/2020 | Ueda | B65G 59/063 |
| 10,865,043 B1 * | 12/2020 | Garcia | B25J 9/0096 |
| 10,994,407 B2 * | 5/2021 | Wehking | B25H 5/00 |
| 11,167,924 B2 * | 11/2021 | Borders | B65G 67/02 |
| 11,338,997 B2 * | 5/2022 | Ueda | B65G 1/0492 |
| 11,787,635 B2 * | 10/2023 | Blotnik | B65G 1/1375 |
| | | | 700/218 |
| 2006/0045672 A1 * | 3/2006 | Maynard | B65G 1/0435 |
| | | | 414/276 |
| 2009/0162176 A1 | 6/2009 | Link | |
| 2012/0213625 A1 | 8/2012 | Roberts | |
| 2013/0149080 A1 | 6/2013 | Martin de Pablo | |
| 2013/0209203 A1 | 8/2013 | Rafols | |
| 2015/0291356 A1 | 10/2015 | Oki | |
| 2016/0272421 A1 | 9/2016 | Hognaland | |
| 2016/0347544 A1 | 12/2016 | Kvifte | |
| 2017/0158430 A1 * | 6/2017 | Raizer | B65G 1/04 |
| 2017/0174431 A1 * | 6/2017 | Borders | B65G 67/22 |
| 2017/0203921 A1 | 7/2017 | Issing | |
| 2017/0225890 A1 | 8/2017 | Li | |
| 2018/0022547 A1 * | 1/2018 | Wehner | B65G 1/065 |
| | | | 414/279 |
| 2018/0312336 A1 * | 11/2018 | Wagner | B25J 9/1615 |

* cited by examiner

100

MODULAR INVENTORY HANDLING SYSTEM AND METHOD

This application claims priority as a non-provisional application to U.S. provisional 63/024,317 filed on May 13, 2020, presently pending, the contents of which is hereby incorporated by reference.

BACKGROUND OF THE INVENTION

1. Field of the Invention

The field of the invention is a system and method of transferring inventory using pick cell modules optimized for each type of inventory item.

2. Background of the Invention

In various embodiments, the invention provides a device and method for optimum inventory transfer within a warehouse environment.

In one embodiment, the invention comprises a conveyor system connected to a number of individual pick cells, each having several types of buffer space to allow for the transfer of products from one type of storage to another. Each pick cell incorporates a robotic manipulator, such as a robotic arm, which is designed to handle a specific type of inventory item or to handle a specific range of item properties (such as items with a particular surface profile, i.e. flat or curved surfaces) by having a particular end of arm tool attached to the robotic arm.

A warehouse operation will typically include a number of conveyor belts and transfer stations where inventory is shifted from one type of work area to another. The inventory transfer may take place using any number of means; for example, a robotic arm may transfer items from one type of location to another. A drawback to a conventional system is that the robotic picker is often waiting on inventory, or the inventory provided by a conveyor system is not appropriate for the end of arm tool attached to the robotic arm.

A need exists in the art for a device and system that can optimize the sending of items to an appropriate robotic manipulator. Further, the system should incorporate efficient and organized buffer space to prevent the robotic manipulator from sitting idle. In at least one embodiment, the system can maximize throughput by reducing the repetitive recirculation of high-frequency mover inventory to fulfill subsequent orders. In some embodiments, the system includes buffering features. Buffering also allows efficient automated control over the sequencing of items in the packing process to optimize pack density taking advantage of product nesting and avoid stacking heavier items on top of objects with fragile properties.

SUMMARY OF INVENTION

An object of the invention is to create a system and method to avoid the idling of resources at a warehouse facility. A feature of the invention, in one embodiment, is that the inventory management system is divided into multiple cells, each cell being optimized for a particular type of inventory item or items having a particular set of inventory properties. These properties include features such as size, weight, level of deformation in the exterior packaging, flexibility, porosity, amount of fragility, surface textures, and others. An advantage of the invention is that it allows for transfers of inventory items at multiple locations with a minimum amount of idling time.

Another object of the invention is to ensure that inventory items are not damaged. A feature of the invention is that inventory items are only handled by optimized end of arm tools which will prevent damage to the items. An advantage of the invention is that it redirects inventory items to an appropriate end of arm tool for handling.

Yet another object of the invention is to provide a system to assemble orders with a variety of items. A feature of the invention is that the pick cells can transfer partial orders between each other to complete all the items required in each order. An advantage of one embodiment is that many different types of items can be mixed and combined into a single order.

A further object of the invention is to provide a buffer area for items before handling. A feature of the invention is that in one embodiment, each pick cell includes a shelf area with dividers. An advantage of the system is that it facilitates the temporary storage of inventory in known locations for subsequent use by the process.

An additional object of the invention is to facilitate order completion within a fixed time period. A feature of the invention is that in one embodiment, the location of each component of an order is known as is the intended pick cell for that item. An advantage of the system is that an upper time limit for order completion can be established based on warehouse utilization levels.

An inventory management system and method are described. The system uses a series of pick cells, each pick cell having a conveyor area, a work area, and a buffer shelf area.

BRIEF DESCRIPTION OF DRAWINGS

The invention, together with the above and other objects and advantages, will be best understood from the following detailed description of the preferred embodiment of the invention shown in the accompanying drawings, wherein.

DETAILED DESCRIPTION OF THE INVENTION

Figure 1:
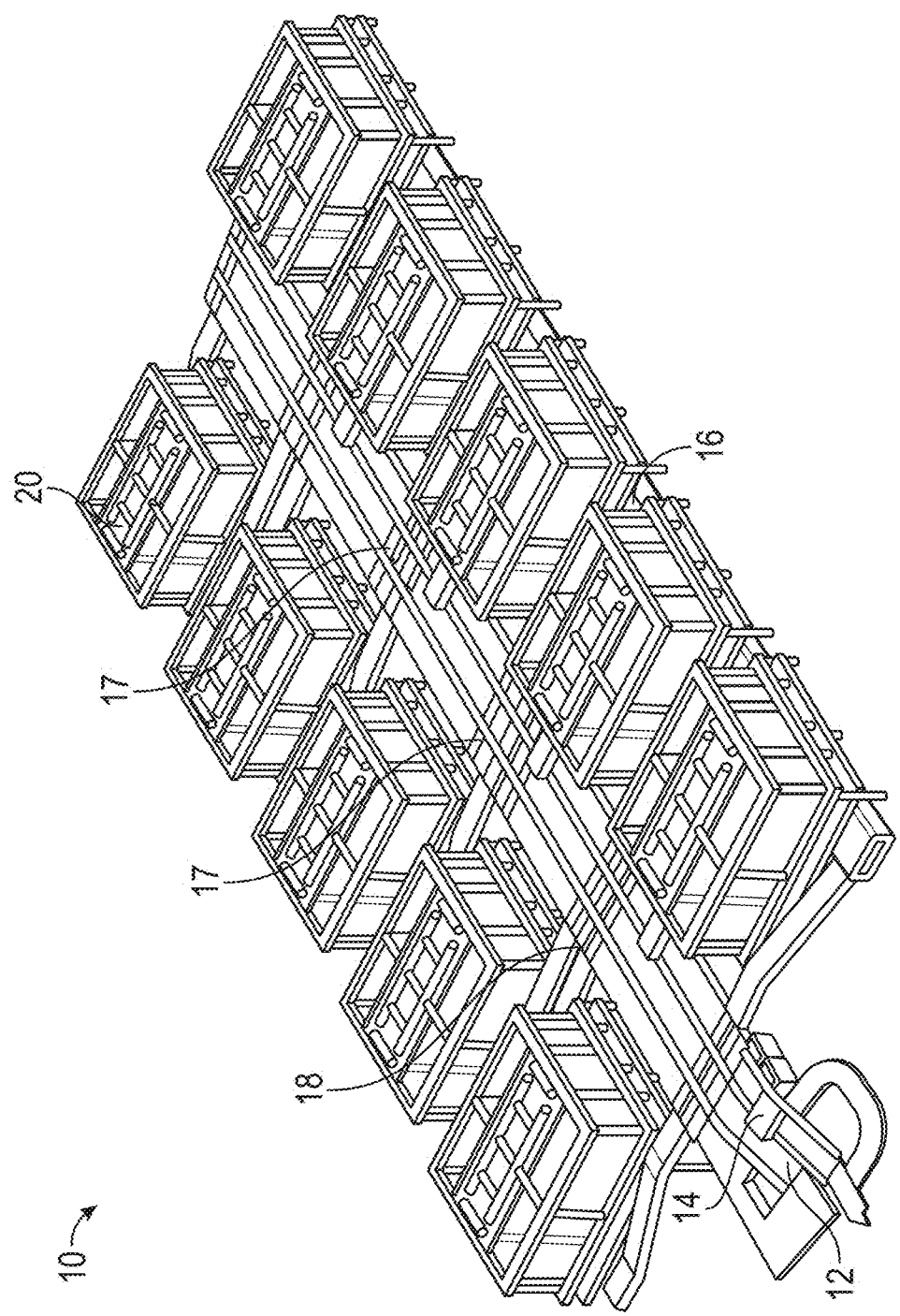
FIG. 1 depicts an overview of one embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random-access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1, depicted therein is one embodiment 10 of the system of inventory management. The embodiment 10 uses a series of conveyors 12 to move containers 14 between individual pick cells 20. The details of each pick cell 20 are shown below. At a minimum, the system would require the use of at least one container and at least one pick cell. The containers used by the system will includes trays, totes, bags, boxes, and other containers with at least one open side.

Conveyors 12 communciate with the transfer areas 16 at each pick cell where a container 14 can be accepted by the pick cell. In one embodiment, the transfer areas 16 are integrated into th conveyors 12. In other embodiments, each pick cell 20 includes its own transfer area 16 independent of the conveyor 12. The transfer areas 16 comprise small sections of conveyors, in one embodiment. In other embodiments, the transfer areas 16 comprise other movement mechanisms, such as grippers. The pick cell include arrays of inventory processing locations, as described below.

Figure 3:
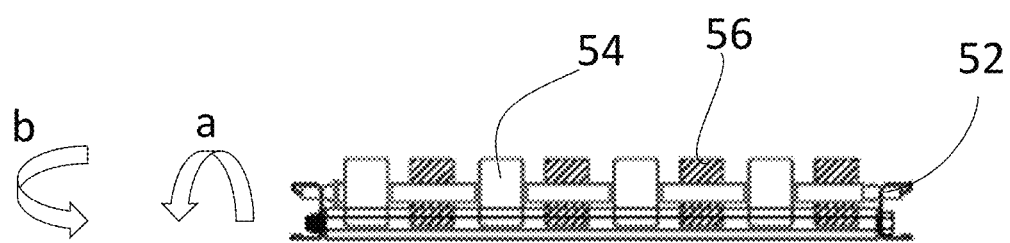
FIG. 3 depicts a detailed view of rollers used in one embodiment of the invention.

The conveyors 12 are conventional motor-driven belt conveyors in one embodiment; in another embodiment, the conveyors use an array of wheels and rollers, as shown in FIG. 3, to be able to move containers 14 in either direction on the surface of the conveyor 12. The conveyors 12 are divided into subareas 18 such that motion in each subarea 18 can be controlled independently. Each subarea 18 ends in diversion conveyors, where a container passing over the diversion conveyors 17 can pass straight through or be diverted left or right off the mainline conveyor, or one of the perpendicular ones.

In the embodiment 10 shown in FIG. 1, each container 14 is directed to a particular pick cell 20, depending on whether the container 14 holds items that are needed in that particular pick cell and further the container 14 holds items that a particular pick cell 20 is optimized to retrieve and repack. The containers are received by the appropriate pick cell and the pick cell robotic arm retrieves items from the containers by using the pick cell robotic arm, as described herein.

Figure 2:
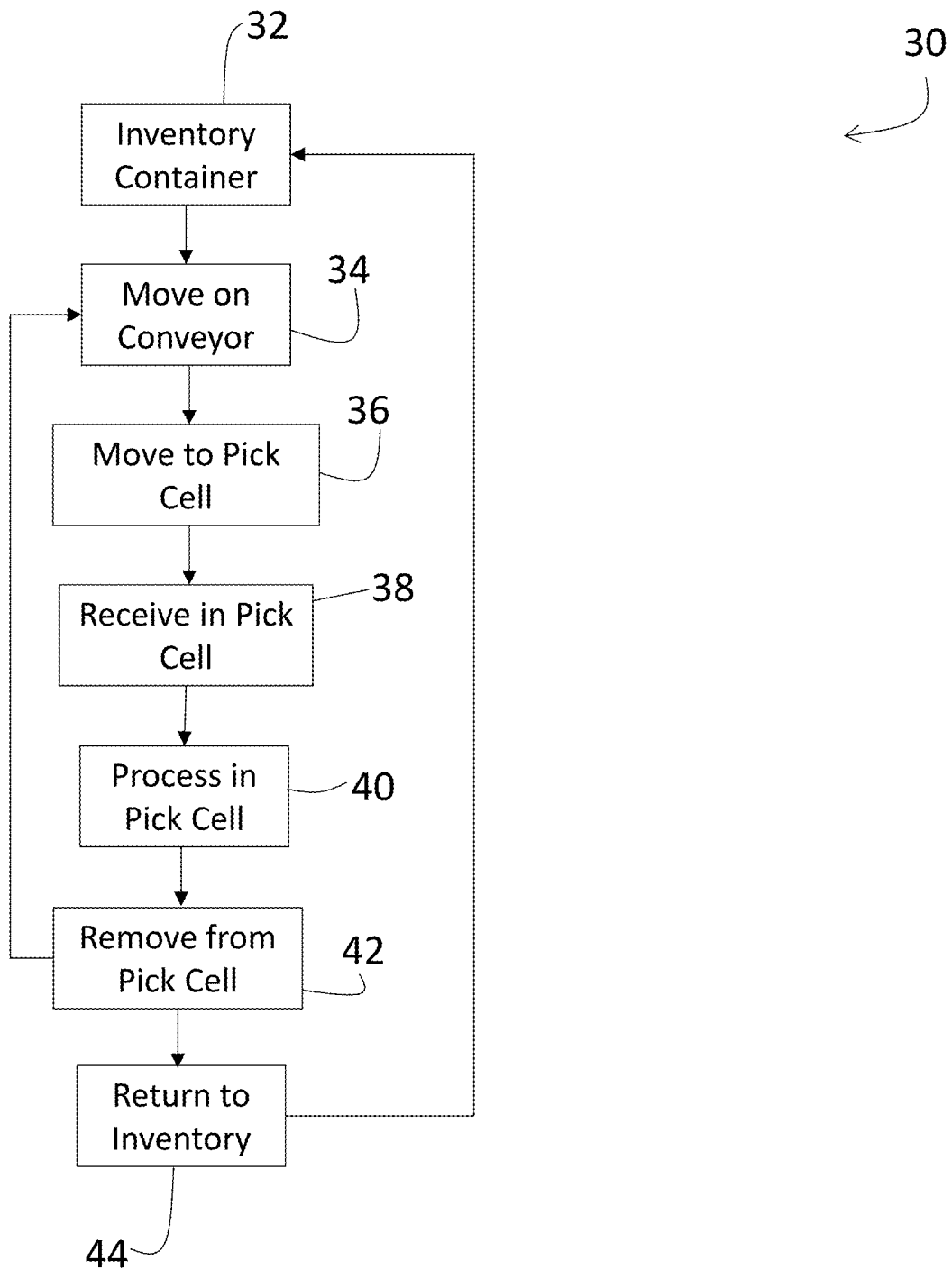
FIG. 2 depicts a flow chart of one embodiment of the invention.

The general method of use 30 of the system is shown in a flowchart shown in FIG. 2.

The process begins with the retrieval 32 of an inventory container. The inventory container may be stored on a shelf in a warehouse or may be retrieved from a vehicle, or other conveyance, such as a mobile robot. The inventory container may contain items, in one embodiment, or it may be empty, depending on what is needed by a pick cell.

Next, the container moves on the conveyor 34 to the set of pick cells. During movement on the conveyor 34, the container is scanned, and its contents are verified, in one embodiment. In one embodiment, during this motion, the system determines where the container should be directed. As shown in the embodiment of FIG. 1, the container must be directed to one of ten potential pick cells. In other embodiments, there are varying amounts of pick cells.

In one embodiment, the target pick cell is chosen on the basis of how busy the pick cell is, the type of picking tool present in the pick cell, the containers associated with the currently open orders or anticipated upcoming orders in the processing queue within the cell or the matrix of cells, and the distance that must be covered by the container during the movement 36 stage.

Once the container moves to the required pick cell, it is received 38 in the pick cell. The details of the receiving area are shown discussed below.

After being received, the container is processed 40 by the pick cell. Items will be moved to and from the container, including moving items to temporary storage areas, as discussed below.

Once the interactions with the container are completed, the container is removed 42 from the pick cell and returns to movement on the conveyor 34 or is returned to the general inventory 44. If the container is needed in another pick cell, it returns to the movement on the conveyor step 34; otherwise, it returns 44 to the general inventory.

In one embodiment, each container includes a machine-readable identifier, such as a bar code or an RFID tag, which allows for tracking of each container.

The details of the rollers of the multi-directional conveyors are shown in FIG. 3. The conveyors include rollers 52, which rotate a first set of wheels 54 in a first direction, depicted by the arrow a. The conveyors also include a second set of rollers and wheels 56, which depict in the direction shown by the arrow b. This allows the conveyors to move items in either direction. In some embodiments, the only movement possible is left/right, forward/back. In another embodiment, the conveyors support a combination of both directions, resulting in a diagonal movement. Each set of wheels 54, 56 is raised and lowered independently to allow for control of movement.

The conveyor rollers are shown in FIG. 3 operate in a specific direction, perpendicular to each other. One set or the other will raise and engage the bottom of the container, driving it in a first direction. The other set drives the container in a perpendicular direction.

Each set of the rollers are linked together in one embodiment, with only one participating roller being directly powered. The conveyors have a weight limit of 200 pounds, in one embodiment. In one embodiment, the system is designed to carry containers up to 53 pounds.

Pick Cell Details

Figure 4:
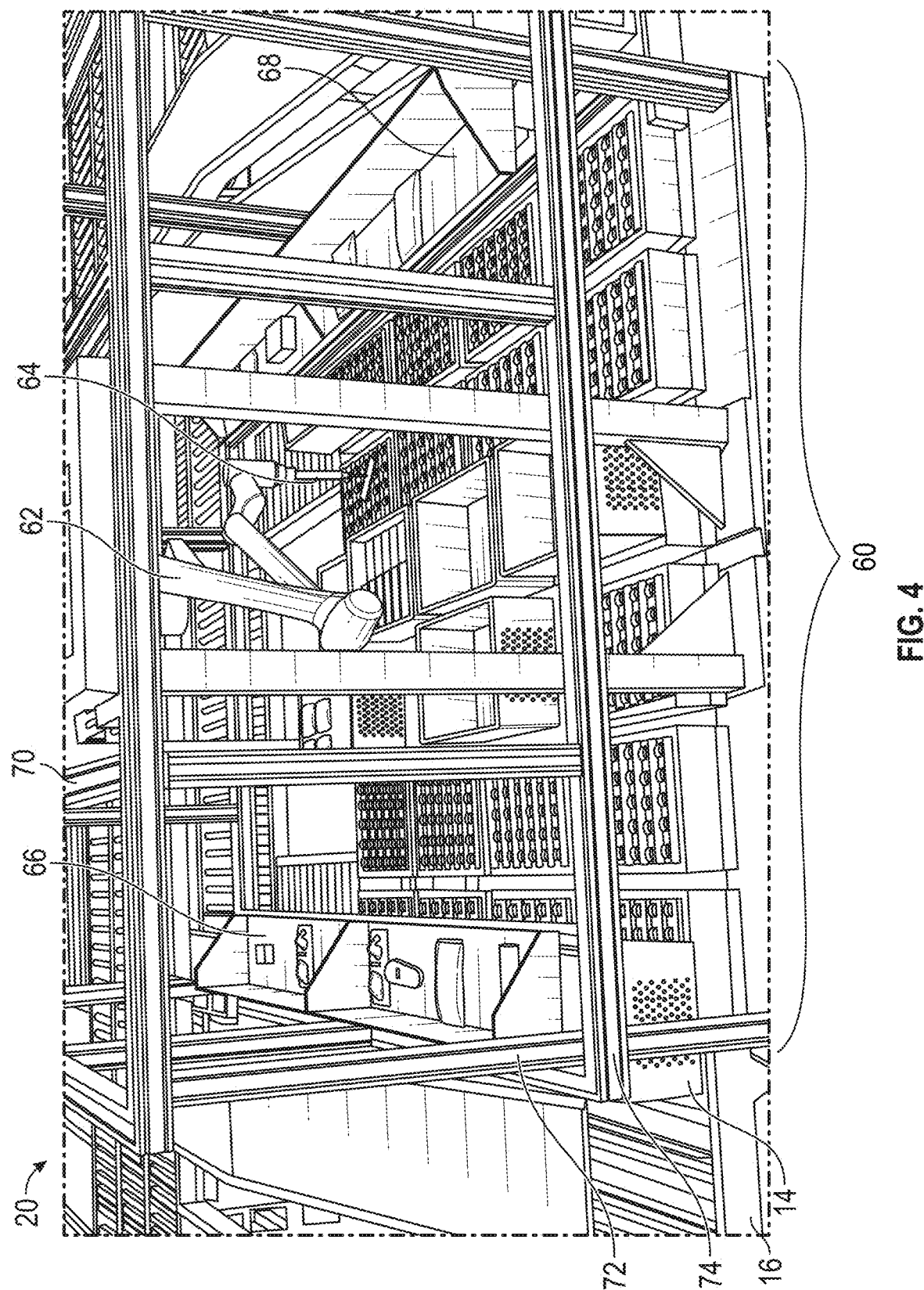
FIG. 4 depicts an overview of one embodiment of the invention.

The details of one embodiment of a pick cell 20 shown in FIG. 1 are depicted in FIG. 4.

Each pick cell 20 comprises at least one pickup and drop-off area 16, where containers 14 enter the pick cell. The pick cell then includes a matrix of container location 60. In the embodiment shown in FIG. 4, the array of locations is a 6×4 grid of individual spots for containers. As each container enters the pick cell, it is conveyed to a cell location within the matrix 60.

An item picking device is found within the pick cell 20. In FIG. 4, the item picking device is a robotic arm 62 equipped with an end of arm tool 64. The robotic arm 62 has sufficient freedom of movement to be able to reach a significant number of container 14 within the matrix 60. In one embodiment, the robotic arm 62 can directly reach sixteen of the twenty-four containers within the matrix, along with all the buffer locations along the buffer shelves.

Items 66 are moved using the end of arm tool between containers 14 to complete orders. However, if a destination container is not present within the pick cell 20, the item 66 will be transferred to a buffer shelf 68, within reach of the end of arm tool 64. The details of the buffer shelf are discussed below.

While in the embodiment of FIG. 4, the pick cell 20 includes two buffer shelves 68 that are located on one wall of the pick cell 20, other arrangements are possible, such as having one buffer shelf or multiple levels of buffer shelves.

Each pick cell 20 also includes a frame 70 with vertical 72 and horizontal members 74. The pick cell can then be separated from other work areas and safely keep a distance between the robotic arm 62 and any other facility workers. In one embodiment, the robotic arm 62 moves along at least one horizontal member 74 to change its position within the pick cell 20.

In this way, the frame 70 acts as both a safety device and also as a means to increase the reach of the robotic arm 62. The frame in this embodiment has several important functions. The frame serves as a safety enclosure, functions as a mounting support structure for cameras and lighting systems, provides ambient light shielding to reduce glare and ambient light interference with the vision system, and reduces dust, dirt, and particulate materials from accumulating from outside the work cell.

In the embodiment shown in FIG. 4, the robotic arm 62 is suspended from the ceiling of the pick cell 20. In other embodiments, the robotic arm 62 may be attached to a sidewall of the pick cell 20 or may be located in the middle of the pick cell 20. In another embodiment, the robotic arm may be mounted in an angular orientation with respect to the sidewalls of the pick cell 20.

While in the embodiment shown in FIG. 4, the item picking device is a robotic arm 62, other picking devices are used in other pick cells, such as a gantry-based pick tool described in the applicant's earlier patent, Ser. No. 16/725,153, filed on Dec. 23, 2019, and earlier patents, the contents of which are incorporated herein by reference.

Figure 5:
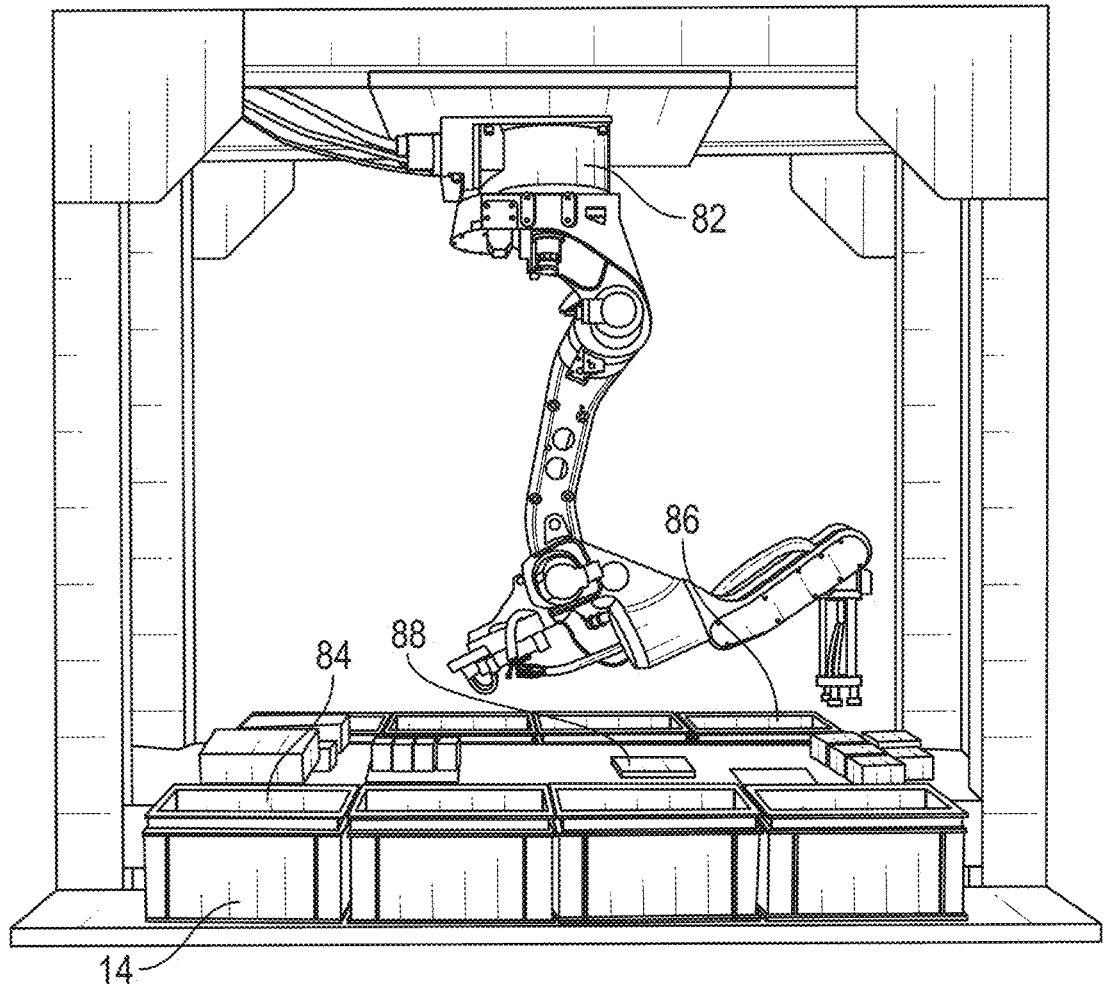
FIG. 5 depicts another overview of one embodiment of the invention.

Another embodiment of a pick cell is shown in FIG. 5. Depicted therein is a ceiling-mounted robotic arm 82, and two areas of product containers 14. One area 84 is designated for source inventory bins. Another area 86 contains containers with orders to be completed from the source inventory bins. In this embodiment, a buffer area 88 is defined between the inventory area 84 and the order area 86. In the preferred embodiment, a buffer shelf is used.

With reference to the embodiment of FIG. 5 a distinction was made between an inventory container and an order container. However, the containers 14 that act as an inventory container or order container are not fixed in their roles. A container that acts as an inventory container at one stage of the order building process may become an order container and vice versa.

Figure 6B:
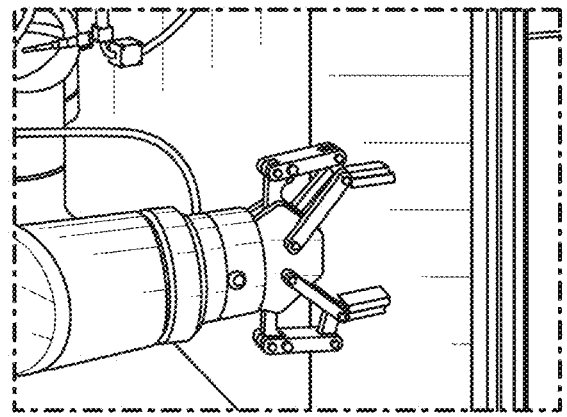
FIGS. 6A-E depict several end of arm tools to be used with various embodiments of the invention.
Figure 6C:
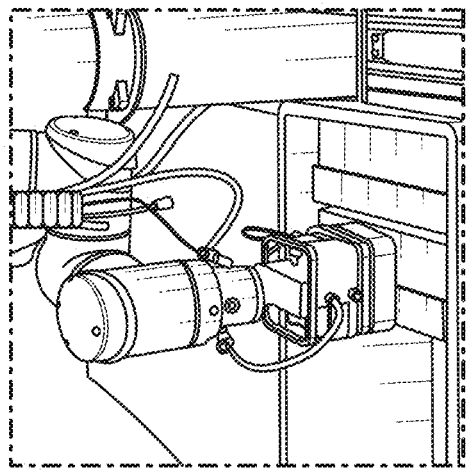
Figure 6A:
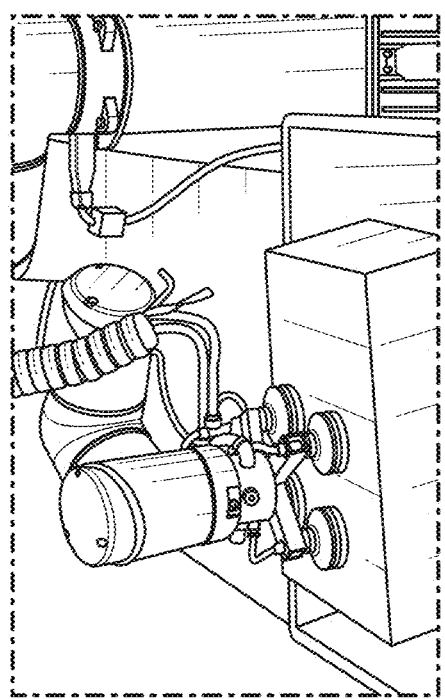
Figure 6D:
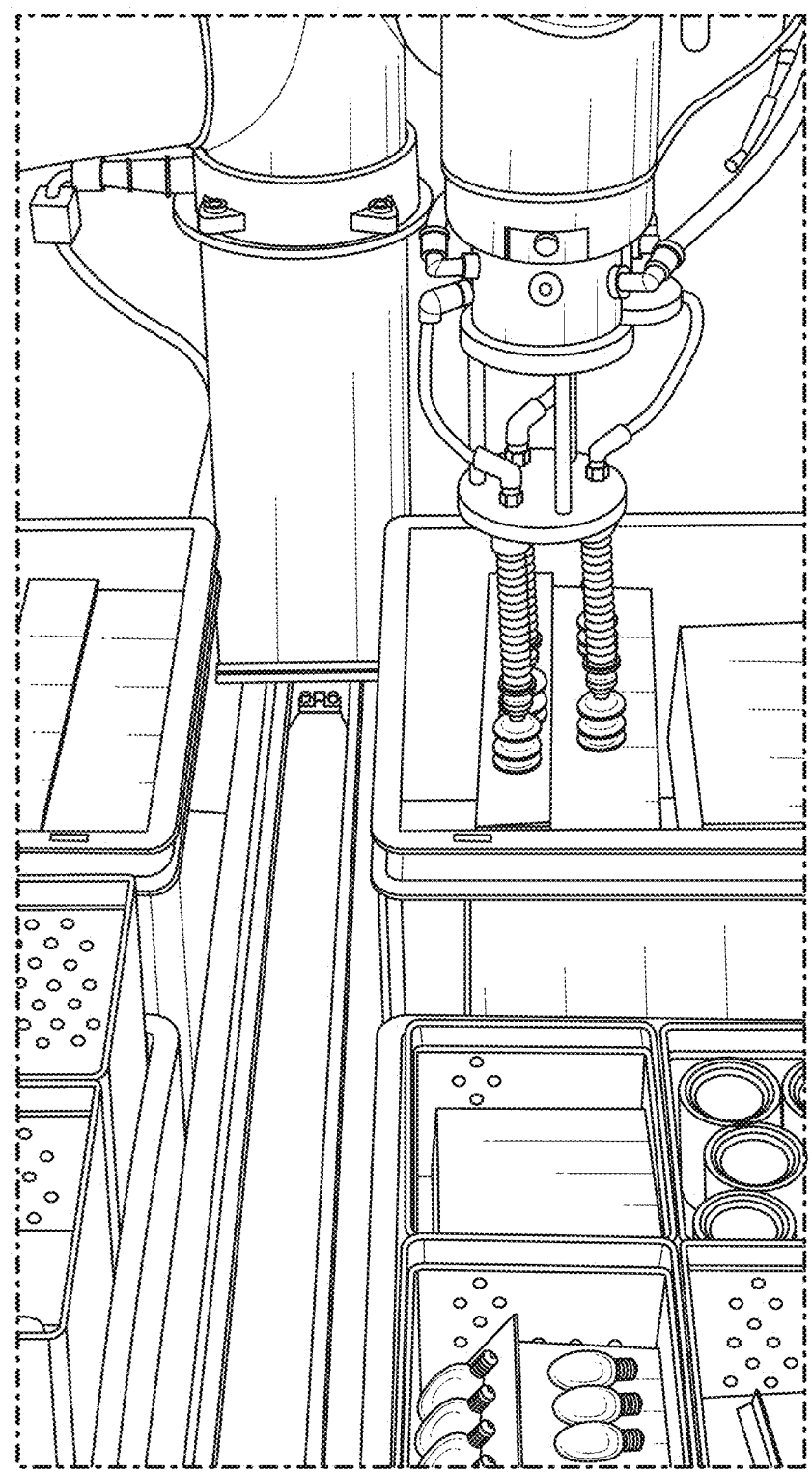
Figure 6E:
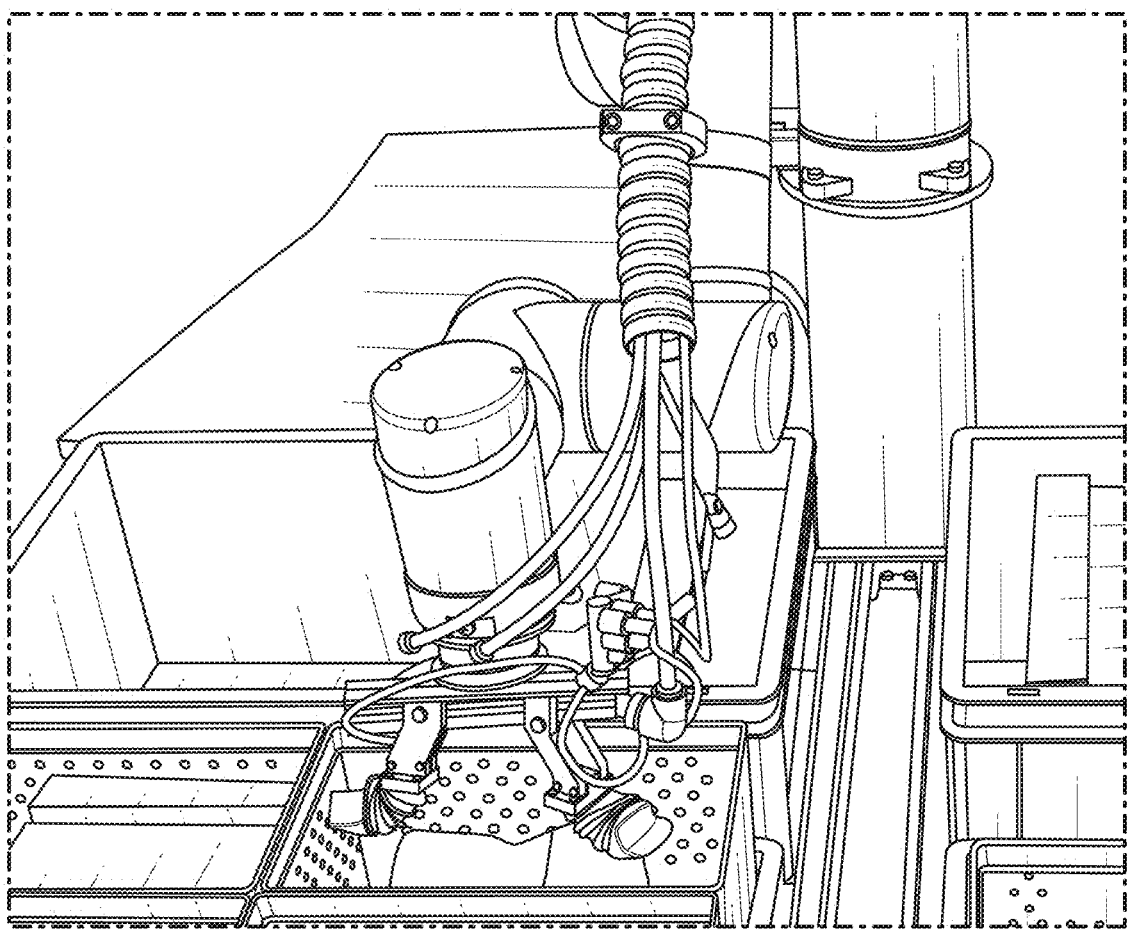

Several potential gripper types are shown in FIGS. 6A-E. FIG. 6A shows a high-capacity suction gripper. These are suitable for heavier items, such as a box of soft drink cans. FIG. 6B shows parallel jaws as used for an end of arm tool, which can be used to pick up oblong items. FIG. 6C depicts a foam suction end of arm tool. FIG. 6D depicts a compliant suction end of arm tool, which can pick up irregular fragile items, such as electronics or bottles. FIG. 6E shows a three-finger gripper, which can be used to retrieve compressible items, such as paper towels or napkins.

In one embodiment, each pick cell is equipped with a different end of arm tool. An order container will visit each pick cells required to fill all items in that particular order. This ensures that an inappropriate end of arm tool is not used to attempt to pick up an item. For example, the high-capacity suction gripper of FIG. 6A should not be used on fragile items. Furthermore, the gripping tools each have performance limits, including a maximum size of an item that can be picked up and a maximum weight. In the current system, each source container is sent to an appropriate pick cell, followed by an order container. At the same time, for many items, the capability ranges of some gripping tools will overlap, and therefore for some products, the products may be picked by a number of possible tools.

Figure 7:
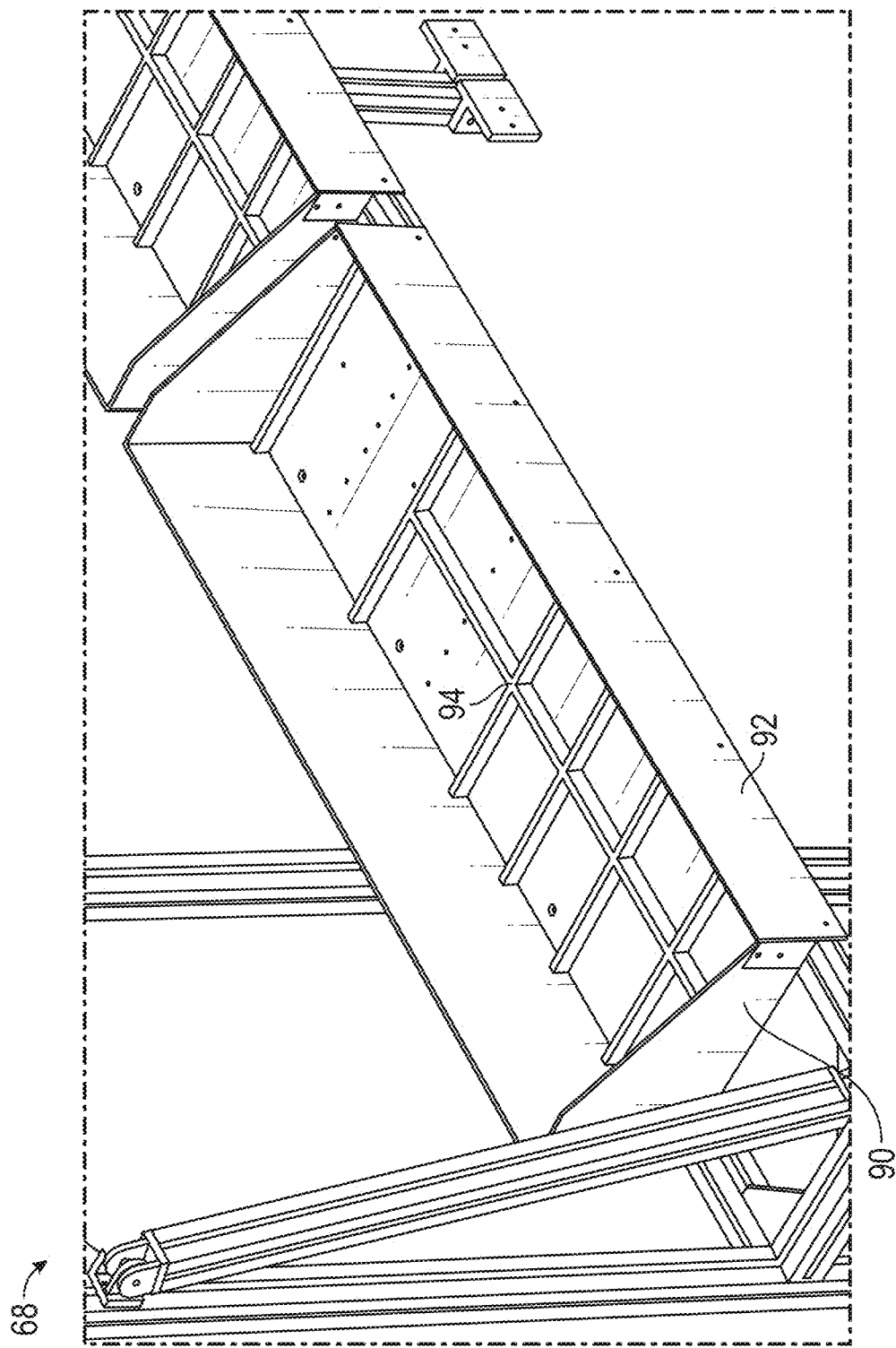
FIG. 7 depicts the details of a buffer shelf used in one embodiment of the invention.

The details of a buffer shelf 68 are shown in FIG. 7, pursuant to one embodiment of the invention. Each buffer shelf includes sidewalls 90 with a lower front wall 92 to allow for access to the shelf. In the embodiment shown in FIG. 7, the buffer shelf 68 also includes internal dividers 94. The internal dividers 94 and the walls 90, 92 ensure that any items place on the buffer shelf 68 do not become misplaced or displaced. Instead, the robotic arm controller can keep track of the last known location of an item placed on each buffer shelf 68.

The buffer shelf allows for much higher throughput in the system. The end of arm tool is not waiting for the correct order or inventory container to arrive. Instead, it can move inventory items to temporary storage while waiting for the appropriate container.

The buffer shelf also allows for queueing of tasks. It allows for look-ahead capabilities of the control system allows picking quantities of a specific SKU from one tray. This allows the picking device to sequentially pick multiple same SKU items, placing them either into an order tote on the matrix or placing it on the buffer shelf for the fulfillment of upcoming orders where order totes have not yet arrived in the cell. This allows multiple picks from the same tray and allowing it to return to storage without the need to recall it again soon afterward for subsequent orders.

Pack Module

Figure 8:
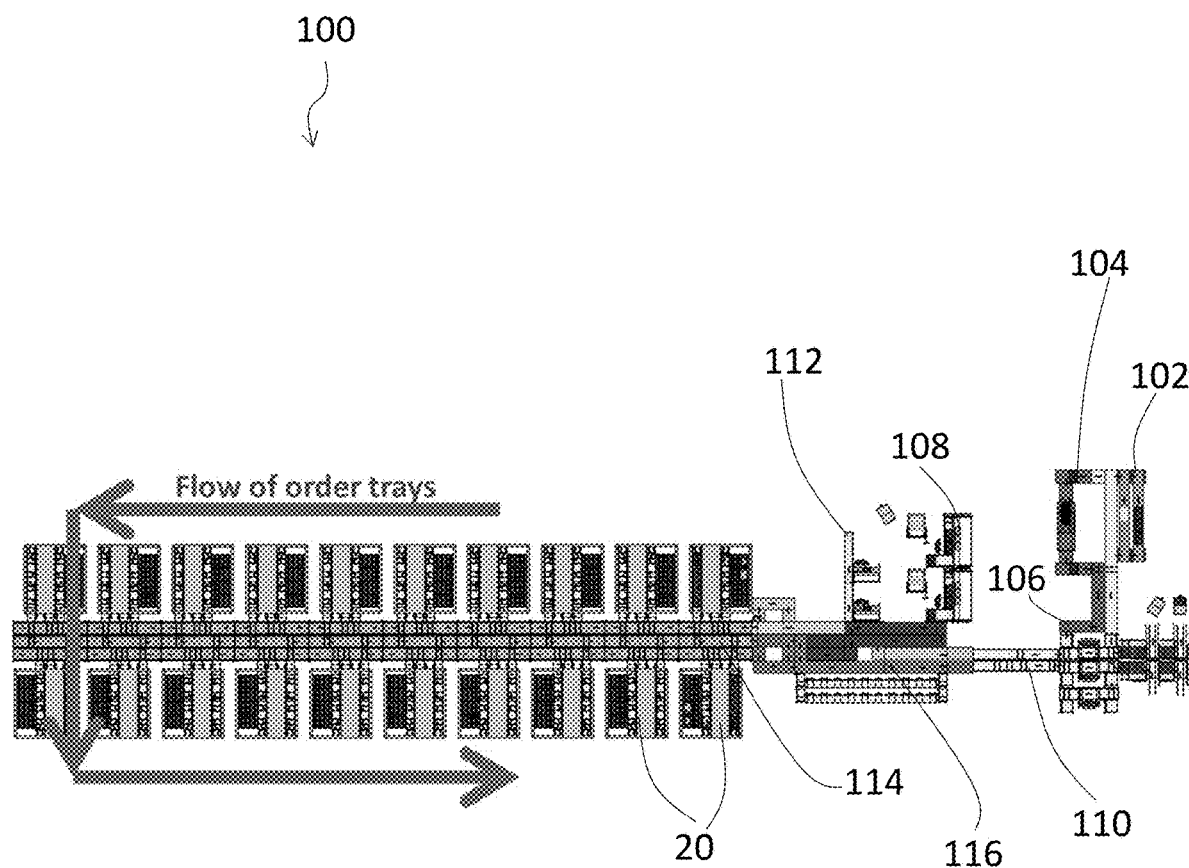
FIG. 8 depicts an overview of an embodiment of the system.

Turning to FIG. 8, a pack module system 100 is depicted therein. The pack module system 100 includes a buffer area 102. Adjacent to the buffer area is the tray opener 104. It is in communication with the empties connector 106 and a manual packing station 108. There is another input/output connector 110, the Value Added Service (VAS) station 112, and pick cells 20. The conveyor includes a mainline 114 and a main connector 116.

As shown in FIG. 8 the system 100 includes a flow of order trays. Inbound trays include inventory and empty trays. Outbound trays are order trays and partially used inventory trays, in one embodiment. The trays also recirculate, including inventory trays that are in the process of being emptied.

Figure 9:
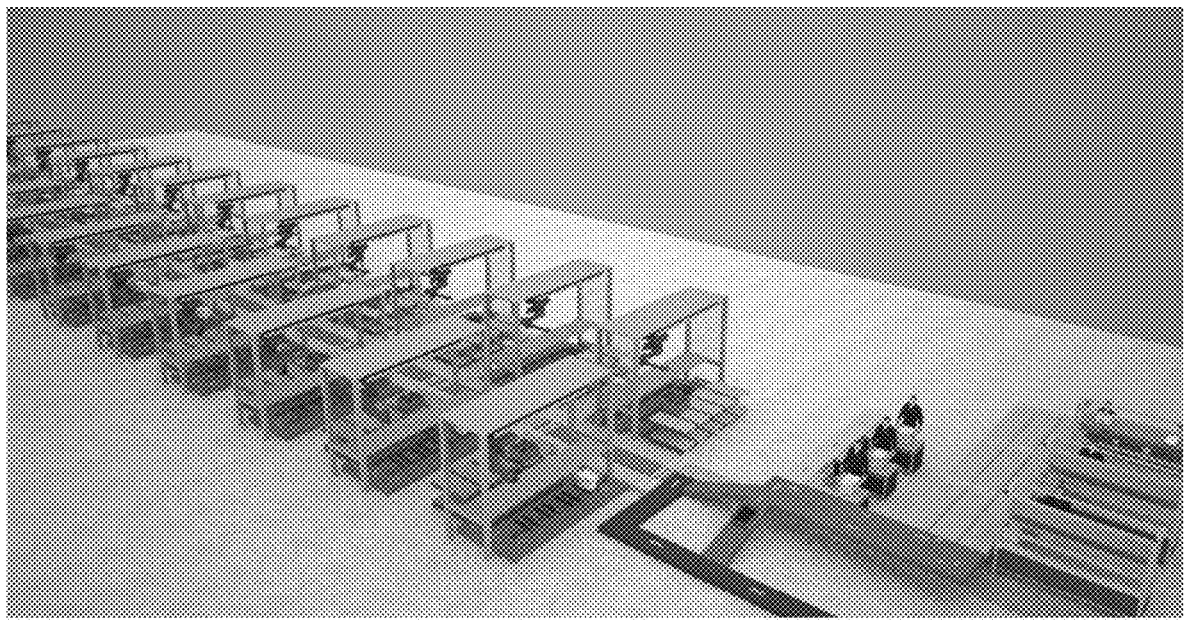
FIG. 9 depicts a three-dimensional overview of one embodiment of the system.

FIG. 9 depicts a three-dimensional overview of the module 100. The module 100 provides a flexible solution. In one embodiment, it provides a range of grippers that can pick practically an item having an arbitrary shape or composition. It eliminates the need for a "pick face" for each SKU. It provides Integrated manual and automated stations, as shown in FIGS. 8 and 9. The system 100 allows for the creation of exact orders wherein each container is precisely packed (items and position). The system supports a mix of any size and a mix of orders.

FIGS. 10A-10I depict several alternative embodiments for the individual pick cells.

Figure 10A:
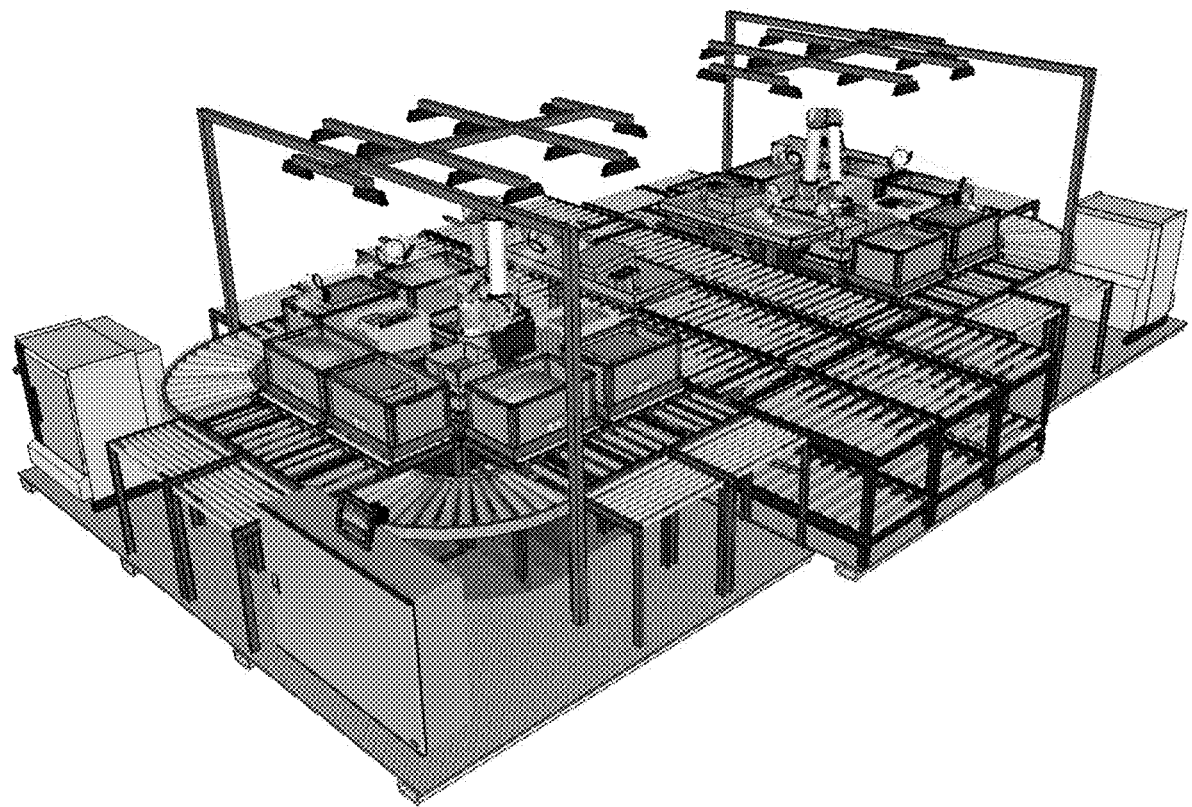
FIGS. 10A-I depict alternative embodiments of pick cells for use with the system.
Figure 10B:
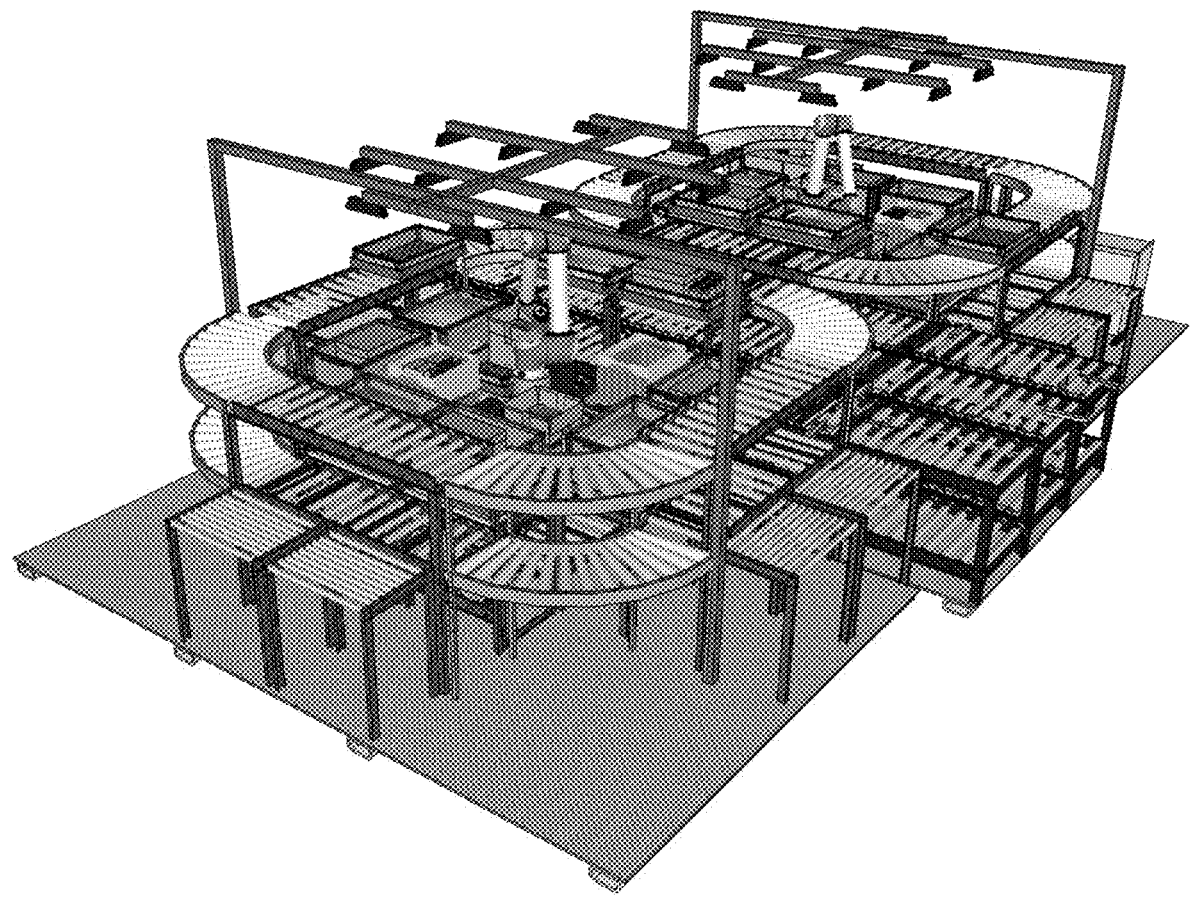
Figure 10C:
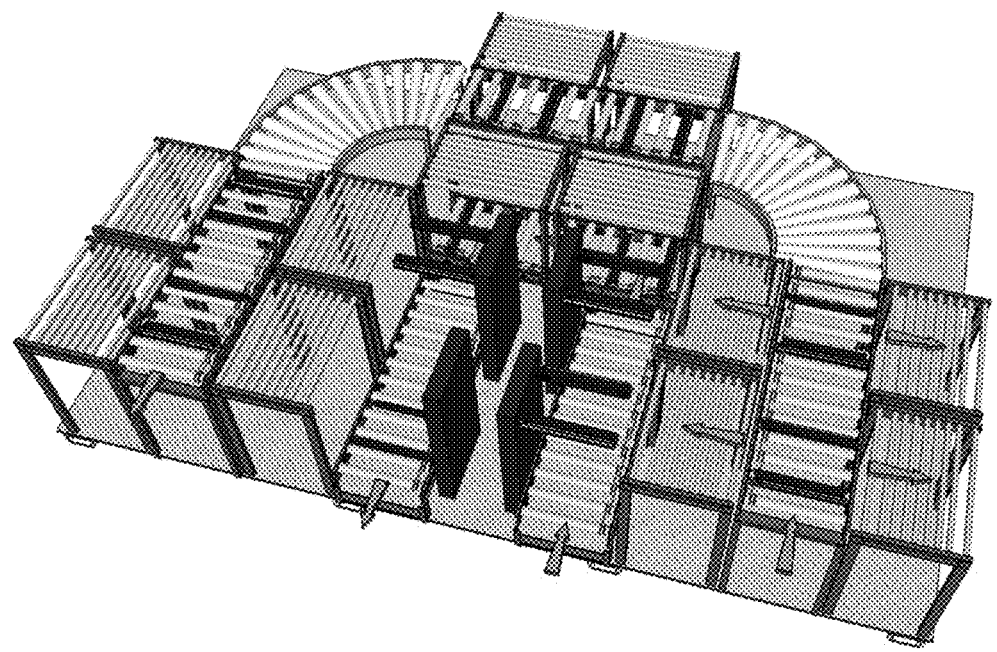
Figure 10D:
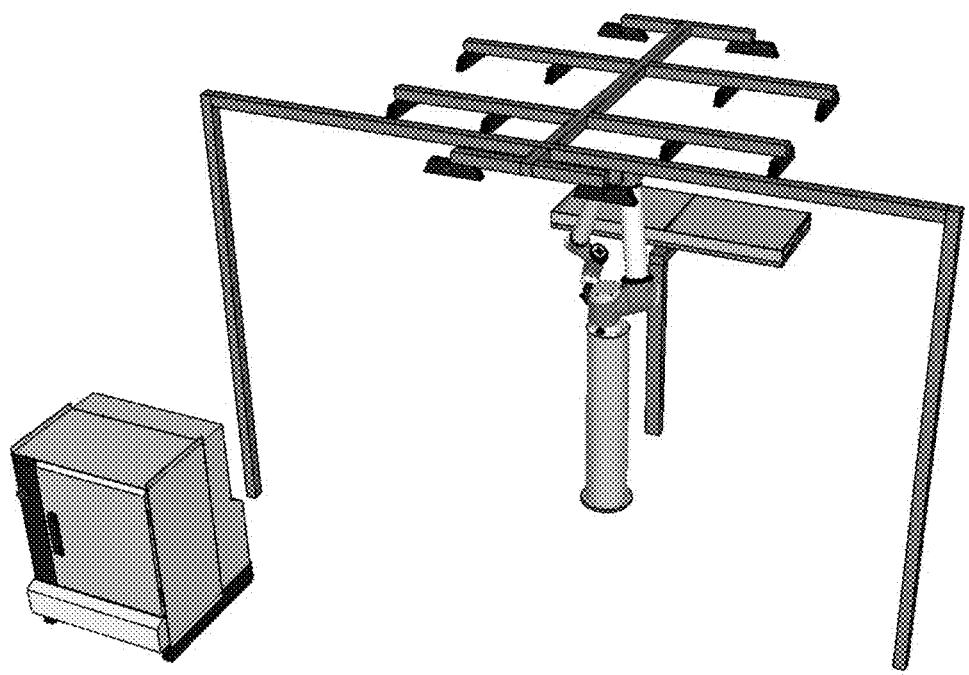
Figure 10E:
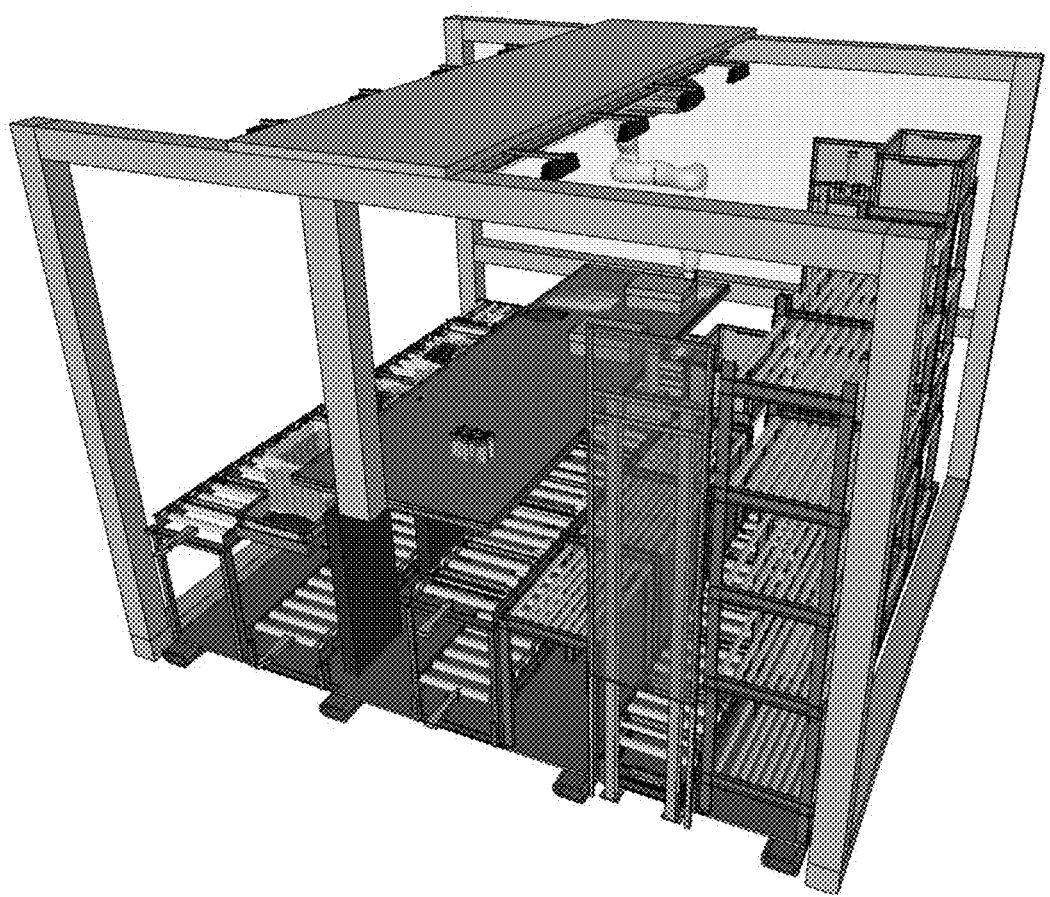
Figure 10F:
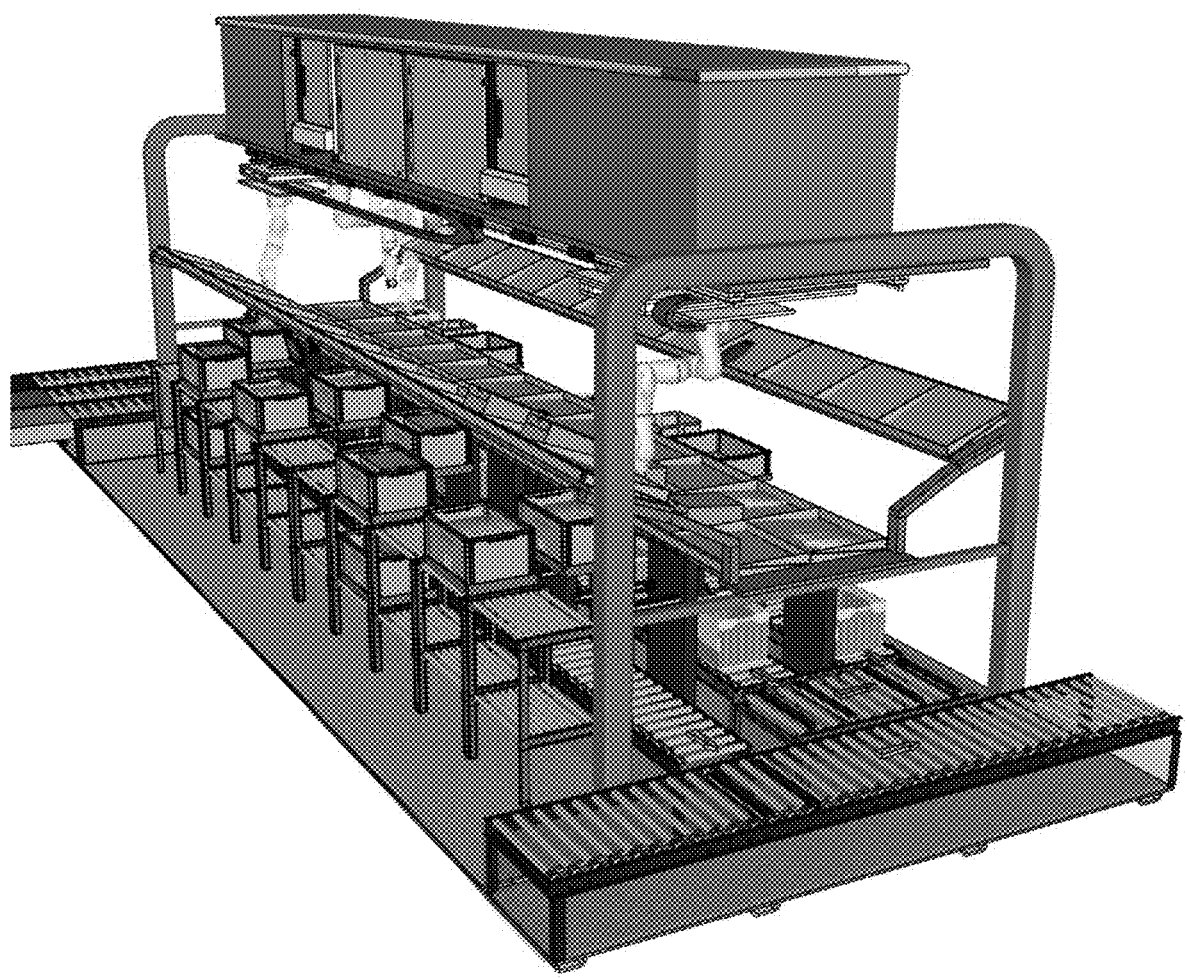
Figure 10G:
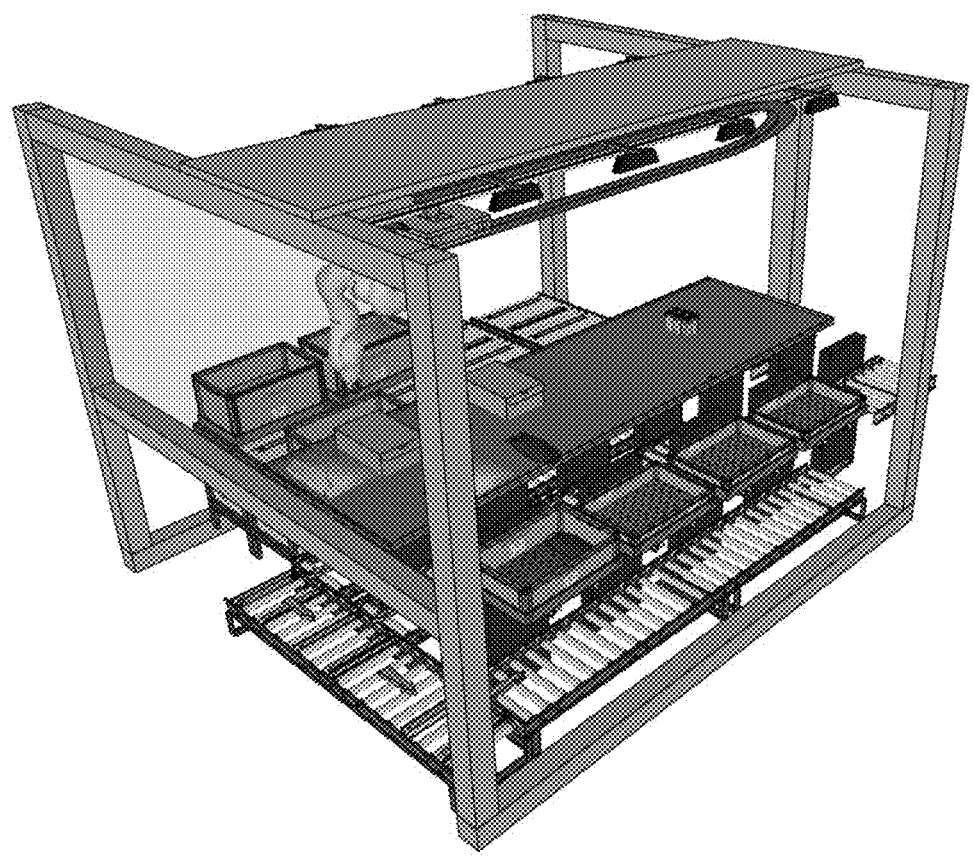
Figure 10H:
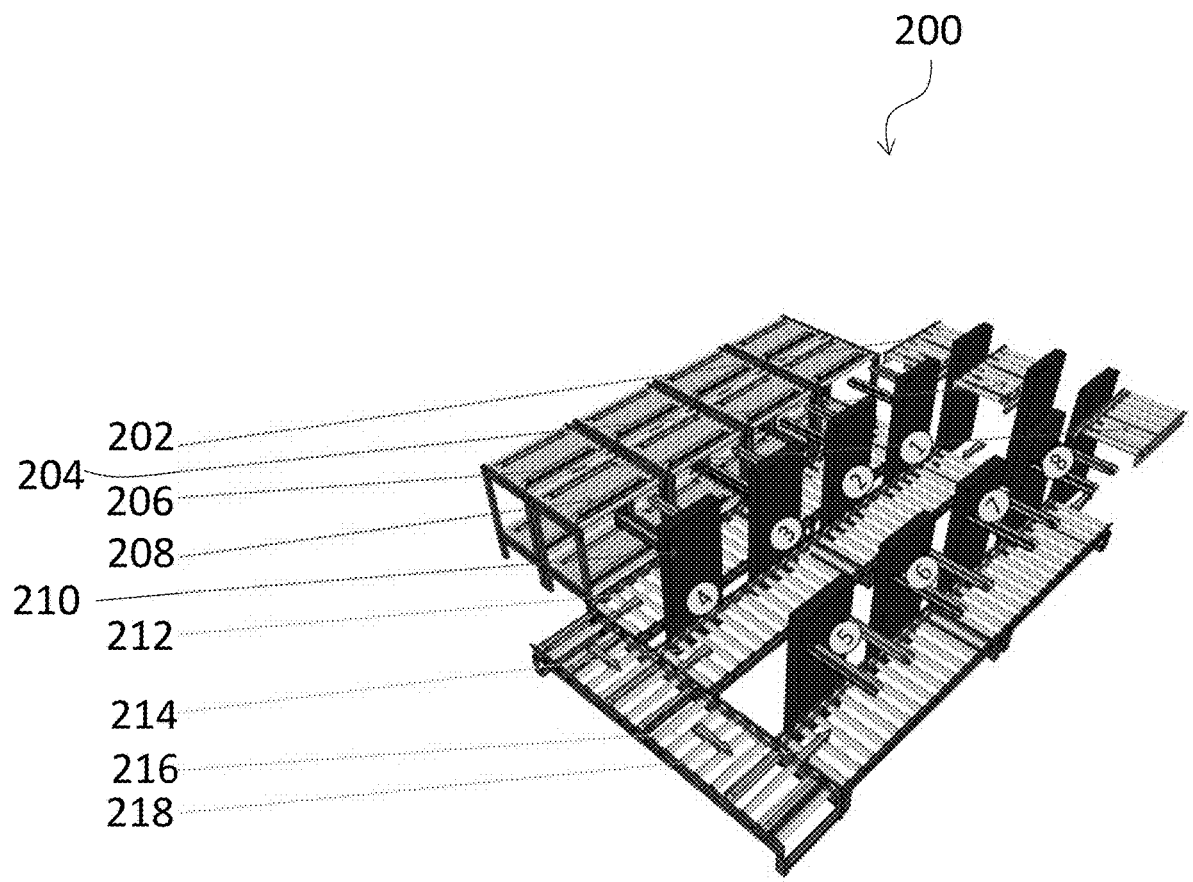

For example, FIG. 10H depicts an auto pack handler cell per one embodiment 200. The embodiment 200 includes an inventory lifter 202, an order lifter 204, and an exist lifer 206. The lifters are designed to align the auto pack handler with the external inventory management system, such as a conveyor (not shown). It includes sixteen cache locations 208, eight lifters 210, an inventory infeed 212, an order infeed 214, a cross lane 216, and an outfeed 218. In this embodiment, an inventory tray arrives from the mainline upper level onto the inventory lifter where it is lowered, or from the mainline lower level. It is conveyed along with the inventory infeed. It can be diverted into the lower level of the cache (sixteen total tray positions). It can also be lifted by a pick lifter and either diverted into the upper level of the cache or held in a position for picking. An inventory tray, once processed, is conveyed by the inventory infeed to the cross lane for exit via the outfeed. An order tray arrives on either level or is handled the same way to get it onto the order infeed. It is conveyed to the cross lane and to the outfeed. It is lifted by a pick lifter. Once processed, it is lowered onto the outfeed.

Both inventory and order trays can exit either onto the mainline lower level or get lifted by the exit lifter and onto the mainline upper level.

In this embodiment, during operations, the order infeed and outfeed do double duty. They convey trays and contain the start position for trays to be lifted for picking or putting. Clogging and delays are avoided since a new tray needs to be positioned for pick or put only every ten or fifteen seconds.

The cache area, in one embodiment, is for fast movers and provides several advantages. The number of trays coming in and out from storage declines, and these cached trays represent a high percentage of total picks that can be single cycle picks.

Since trays arrive at an auto pack component on an average of every five seconds or so, in one embodiment, and the software can avoid having trays ever arrive one right after the other, the mainline conveyors will never have to stop a tray to wait for an inbound lifter. The lifter cycle is fast enough to accommodate incoming trays, in this embodiment.

Figure 10I:
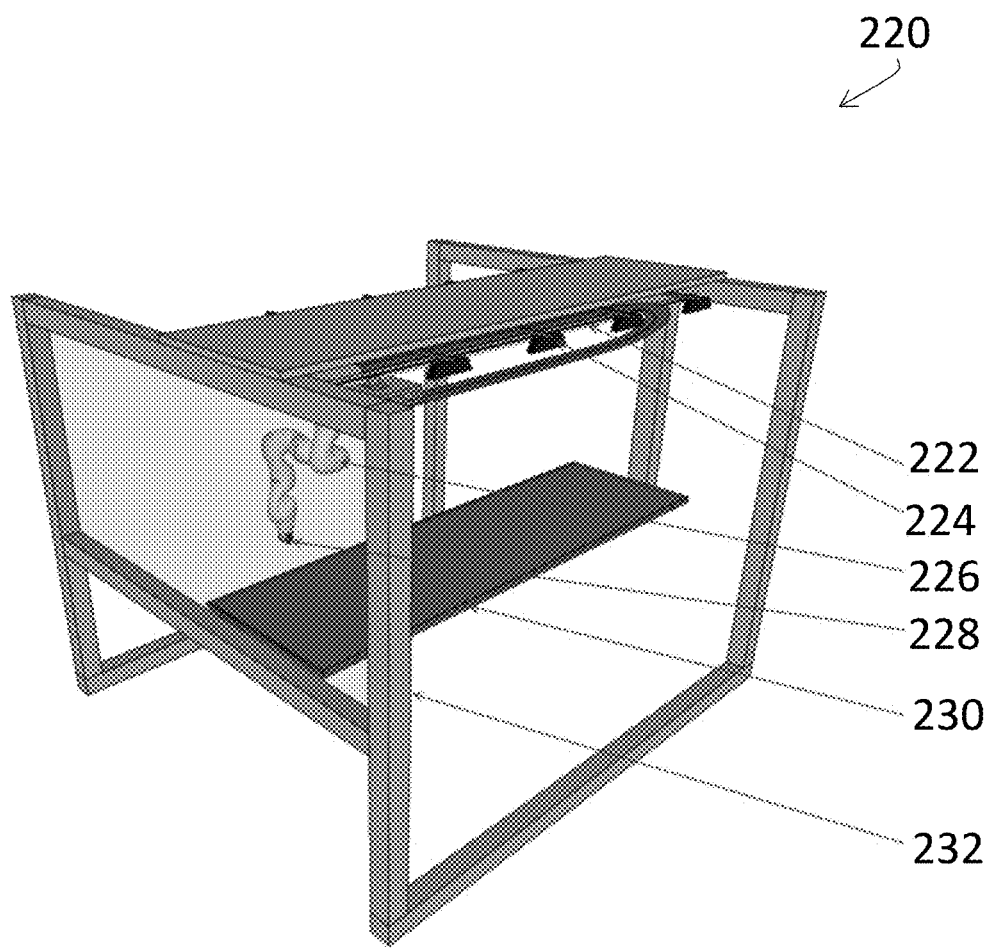

Turning to FIG. 10I, depicted therein is an auto pack pod cell embodiment 220. The embodiment 220 includes a robot transport unit 222, multiple cameras 224, the robot 226, and the end of arm tool 228. The frame 232 of the embodiment 220 includes a buffer table 230. The components include an articulated robot that picks and puts items. Each robot has a gripper of a certain type. The robot is ceiling-mounted on an RTU (robot transport unit). The robot can move on the RTU along the length of the item buffer table. The buffer table holds items on a short-term basis of a few seconds to a few minutes that have been picked from inventory trays. The buffer table is designed to hold products in a stable manner (prevent roll-off), in one embodiment. The frames of the pick cell support the RTU, buffer table, and other equipment.

Cameras (or other complementary vision and sensing equipment, depending on the embodiment) are mounted overhead, on the frame and robot, in one embodiment.

During operations, there are two types of picks and puts, in one embodiment. A two-cycle pick is when an item is picked and placed on the buffer shelf or table, and at a later time, when the item's order tray arrives, it is picked from the buffer table and placed in the order tray. A one-cycle pick is when an item is picked, and the order tray is present within the cell so that it can be put directly into the order tray.

In some embodiments, two sizes of articulate robots are present. In one embodiment, the auto pack component is designed so that robots of varying parameters are nearly the same, and the pick cell structure can handle multiple robot sizes and any approved gripper.

Figure 11:
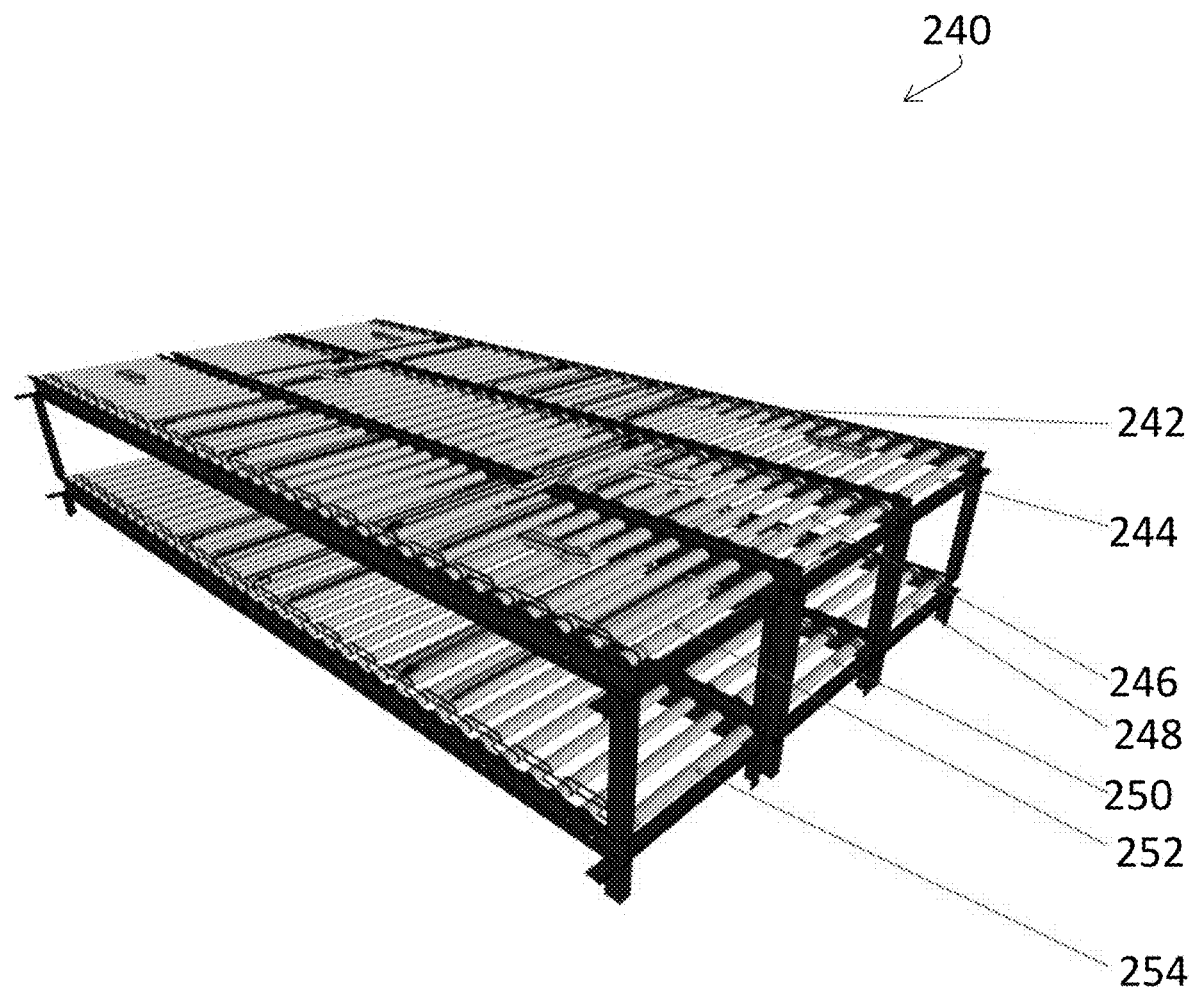
FIG. 11 depicts the details of a mainline conveyor used in conjunction with one embodiment of the system.

A mainline cell is shown in FIG. 11, pursuant to one embodiment 240. The principal components of this embodiment 240 include the popup transfer sub-component 242, the upper inlane 244, the upper exit 246, the lower inlane 248, the lower exit 250, the upper outlane 252, and the lower outlane 254. A mainline cell is atypical in that it consists of a pair of large components (for picking) and with conveyor lanes in the middle. Thus, each pick cell has two articulated picking robots. A benefit of this embodiment is that a pick cell can be modular with each added cell appended to the previous one. In one embodiment, the only constraint applicable is that a pack module can have a wide range of pick cells, but there must be an even number of articulated robots.

In this embodiment, overall, the following are the main processes in the pack module:

One task for this embodiment is picking from inventory trays. A tray stack comes in from storage or even receiving, is destacked, and conveyed to pack cell. Items get picked from it and placed on the buffer table or, if the order container is present, directly into the order container. If a tray is going to be used again shortly, or a fast mover, it is held in a cache at each pick station. If not, it is sent out of the module.

Additionally, in this embodiment, there is buffering of empty trays A stack of trays comes in via the stack handler and is conveyed to a tray buffer. Stacks are released to a tray opener, and a tray is separated from the stack and conveyed to the pack stations.

In this embodiment, the system fills orders. An order tray will have a route, for example, pick stations with identifiers 3, 7, 9, 14, and 23. In one embodiment, nearly all routes are in increasing numeric order because items for the lower part of a container (heavier) are picked earlier at the lower numbered pick stations and so on. A bag of potato chips, for example, is picked at the later stations. An order container may go to the manual pack and value-added (VA) cells for special handling and then out of the module. There is a shuffler where trays are organized so that a payload can have exactly one destination, such as manufacturing operator #51 (for kits) or packaging station number four (for outbound distribution orders).

Note that case packs do not go through the pack module in some embodiments.

Additional Embodiments

Figure 12:
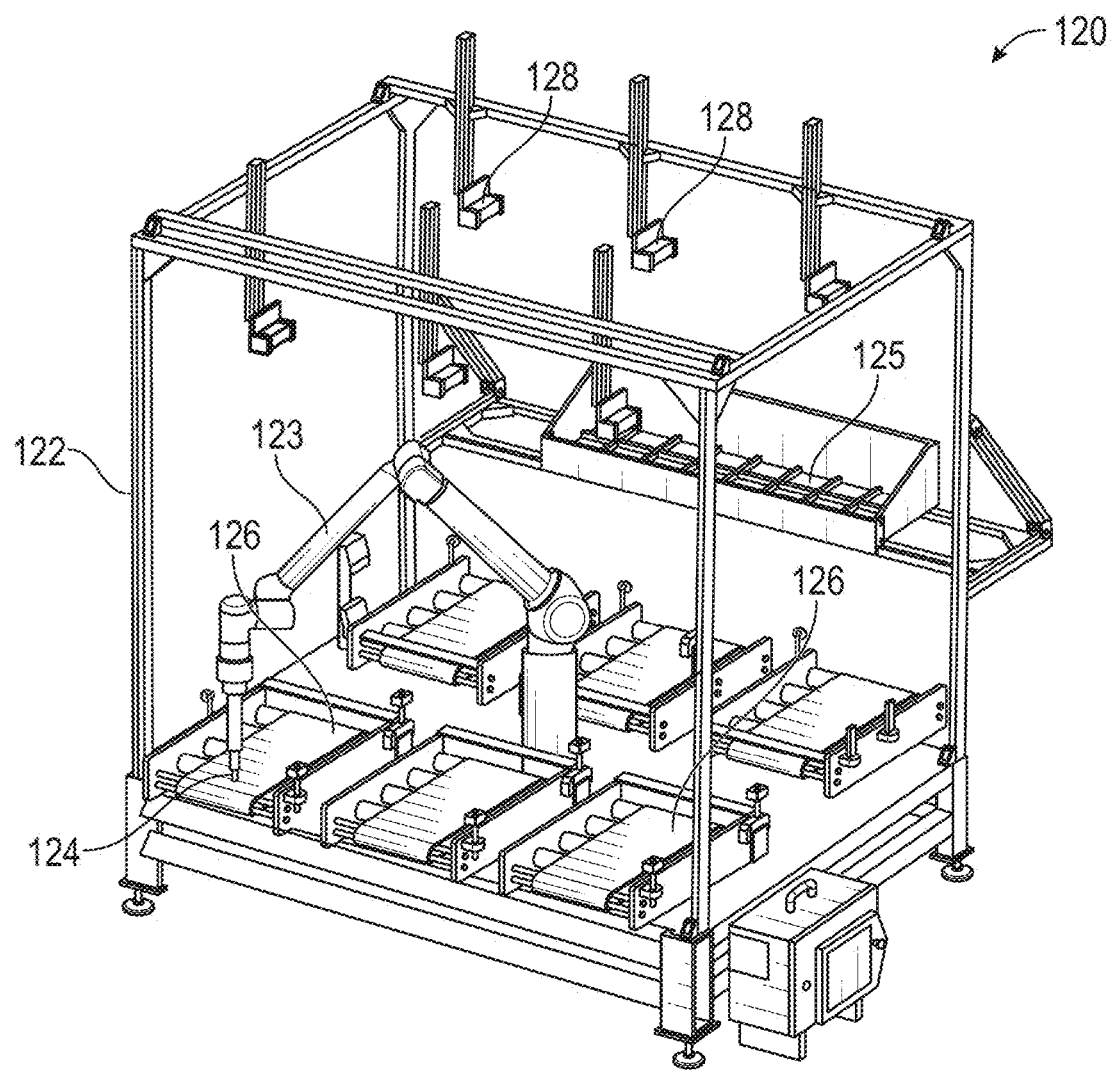
FIG. 12 depicts an overview of another embodiment.

Additional embodiments of various components are shown beginning with FIG. 12.

The additional embodiments provide a number of benefits. These include upgradeability of the software as improvements as the software is finalized. The embodiments allow for optimized use of engineering and build resources to demonstrate changes to the system. The embodiment facilitates the flow of inventory according to the ideas shown in the system, even if the embodiment is built on a smaller scale than an entire facility or a warehouse, for example. The embodiments support experimentation with alternative structures and software solutions without requiring complete redesigns of equipment or control hardware and machine controls therefore limiting development time. As shown in the figures, the system uses individual modules or cells, which means any implementation will be built using a phased approach and allows multi-cell expansion as demand grows. The embodiments are also expandable and allow for the addition of ancillary equipment and specialized cells, for example, a tote erector, closer, shuffler, and others.

The additional embodiments facilitate a demonstration, test, and validation of the multi-gripper type auto pick capability described in this application. The embodiments reuse all or most equipment, machine code, and software for other embodiments. The additional embodiments mirror the material flow of the proposed full production module. The embodiments further characterize material and process flow, and include logging components that collect engineering, reliability, and quality data. The embodiments also validate full production module plans, compare real-time performance data with simulation findings and develop standard plug-and-play gripper tool option packages to allow SKU type expansion.

As shown in FIG. 12, the embodiment of a cell 120 comprises a cell frame 122 surrounding a picking arm 123, which reaches any one of six container locations 126 shown as short conveyor belt areas. The picking arm 123 has a pick tool 124 which is adapted to interact with the expected inventory items in the containers (not shown) to be placed in the locations 126. Each container location 126 is independently actuated in one embodiment so that containers can approach and leave the cell 120 as needed. The picking arm 123 also has access to at least one buffer shelf 125, which is part of the cell frame 122. As described above, the buffer shelf 125 includes dividers to securely hold inventory items while they are stored temporarily on the shelf 125. The cell frame includes sensors and lights 128 suspended from the top portion of the frame 122. In other embodiments, the sensors and lights 128 comprise only passive components, such as lights that are turned on whenever the station is in use. Each pick cell frame accomodes multiple buffer shelves, in one embodiment.

Each cell 120 can include a variety of picking arms 123 and tools 124. The cells 120 can use a number of controllers, such as external controllers for integration with other modules or pick cells.

The embodiment of a cell 120 is designed to recognize and classify inventory in three hierarchical logical groups. The three-tier definition of inventory sources allow for optimum handling of the inventory. The three levels include inventory from another pick cell, inventory from the warehouse or an external source of inventory, and inventory from the buffer tray.

Figure 13A:
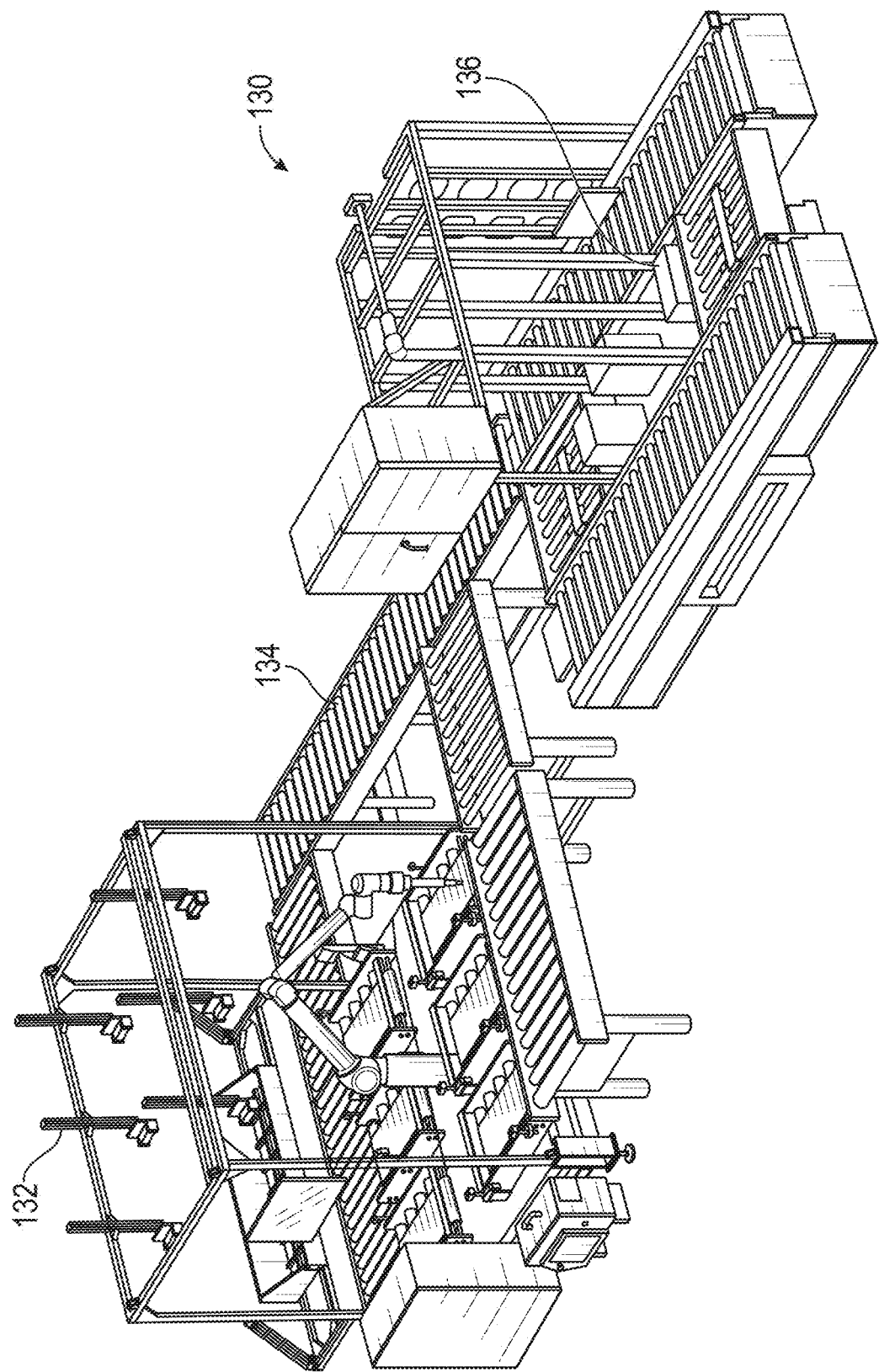
FIGS. 13A-D depict three-dimensional and schematic overviews of various embodiments.
Figure 13B:
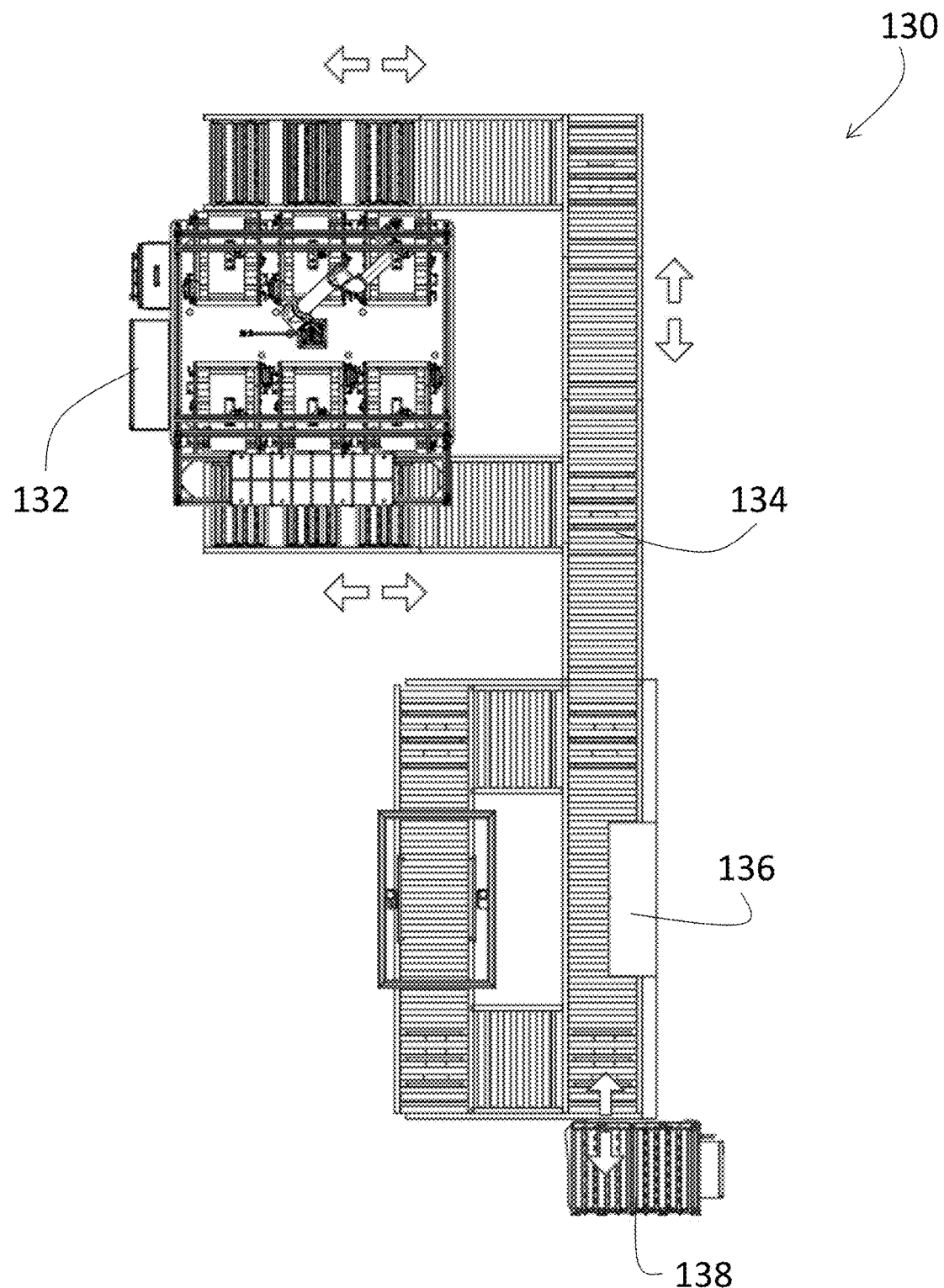

A further embodiment is shown in FIGS. 13A and 13B. FIG. 13A is a three-dimensional overview of the system, while 13B is a schematic depiction of the embodiment.

In FIG. 13A, the embodiment 130 includes a pick cell 132, as shown above, for example, in FIG. 12, a conveyor system 134 connecting the pick cell 132 and a traditional stacker 136.

The embodiment 130 integrates a six-station cell 132, a stacker/de-stacker station 136 and an automated material handling conveyor system 134. The system integrates with a stacker station that can transfer containers from other stations or mobile robots. The conveyor provides lift and transfers, as needed. The embodiment 130 is a single point inventory manager to drop and retrieve containers. The cell module 132 includes a controller, such as Beckhoff controls. The embodiment 130 is capable of fully automatic function. Inventory is provided to the stacker 136 which packages the contents into containers, which then are processed by the cell 132 and returned to the inventory by the stacker 136.

FIG. 13B which shows a schematic overview of the system, also depicts a mobile robot 138 interacting with the stacker 136 is depicted in FIG. 13B. The mobile robot 138 picks up and drops off containers to the stacker/de-stacker 136, which in turn sends the containers to the cell 132 using the conveyor 134.

Figure 13C:
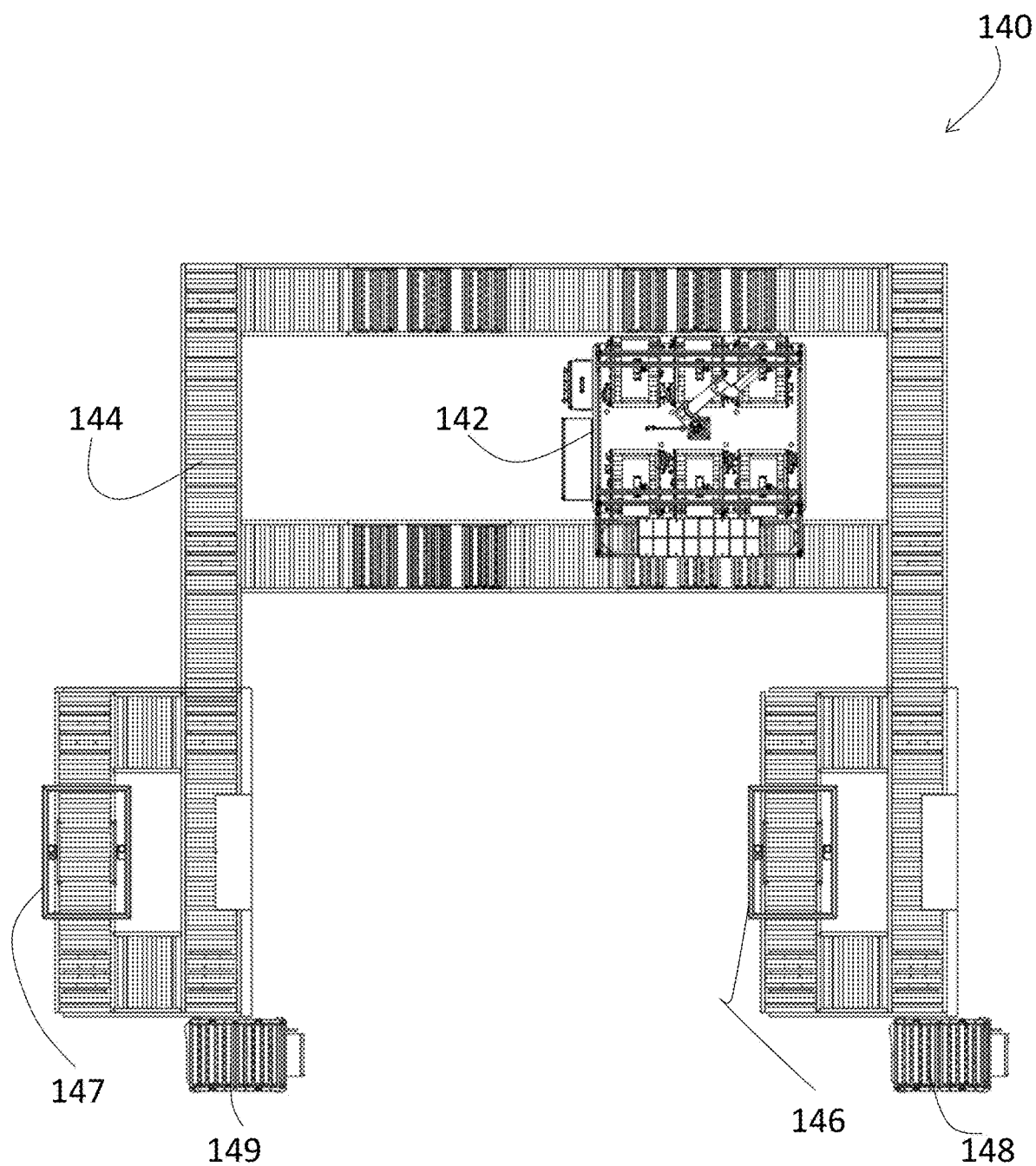

FIG. 13C is another schematic overview of an embodiment 140. In this embodiment 140 the cell 142 is connected by an expanded conveyor 144 to two stacker/de-stacker stations 146, 147. Each station 146, 147 can interact with inventory input means, such as the conveyor or mobile robots 148, 149 shown as interacting with the stations 146, 147.

As FIG. 13C demonstrates, the pick cell 142 can accommodate multiple input/output areas such as shown by the multiple stacker/de-stacker stations 146, 147.

In one use scenario, the embodiment 140 is used with the dual stacker stations 146, 147 and the inventory materials flow in one direction, with one station designated as input and the other as output. A benefit of this embodiment is that no mechanical changes are needed to expand the solution from the embodiment 130 shown in FIG. 13B to the dual station embodiment 140 of FIG. 13C.

Figure 13D:
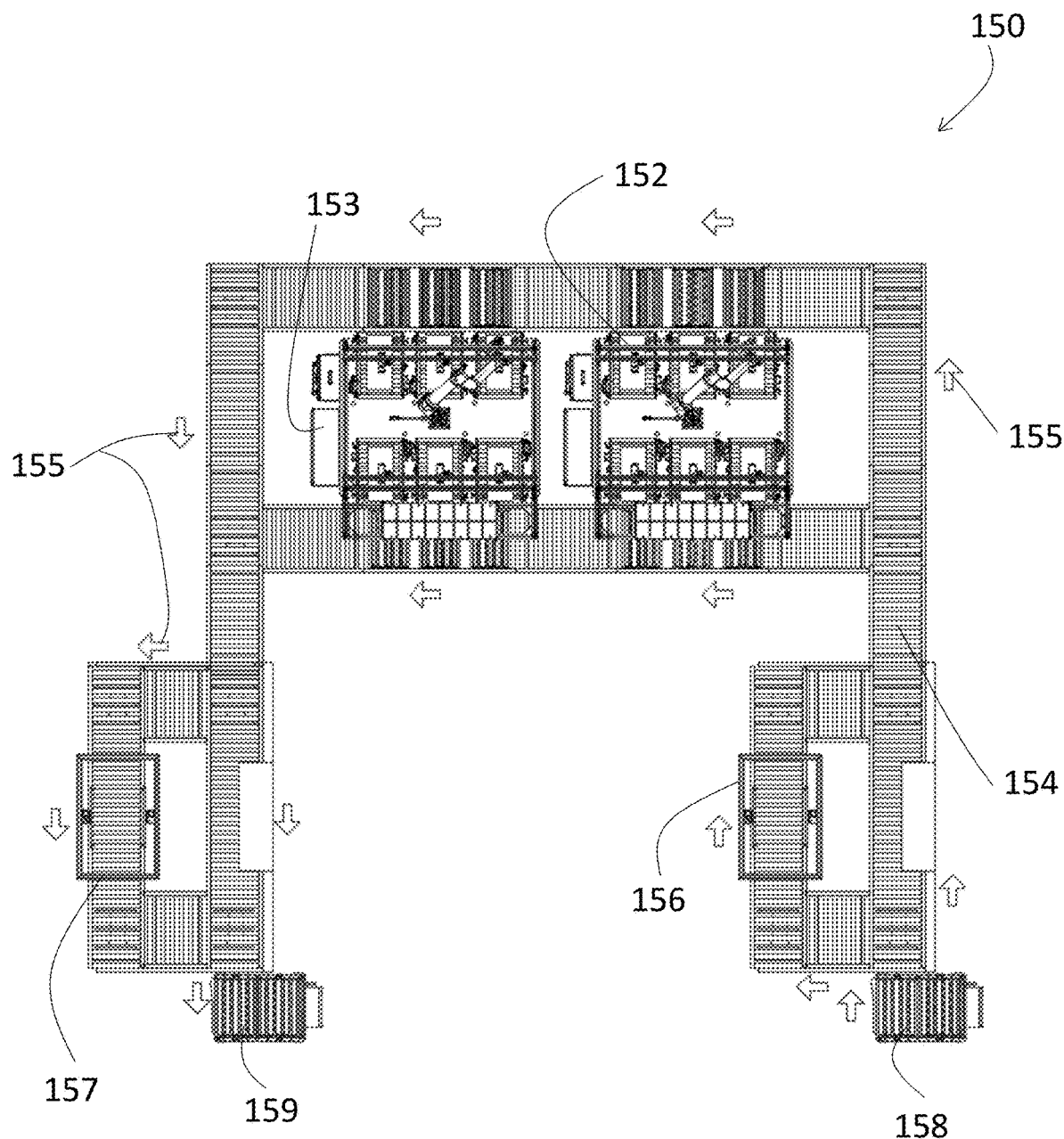

FIG. 13D is yet another embodiment 150 of the system. In this embodiment there are two inventory pick cells 152, 153. The conveyor system 154 encompasses all components and the flow of the inventory is shown by the directionality arrows 155. The single direction or one-directional movement of inventory flow as shown by arrows 155 allows for higher throughput.

The inventory passes through the system first by being picked up by the mobile robot 158. Then each container or bin is placed into the stacker/de-stacker 156 and manipulated as necessary. The conveyor 154 then moves the inventory to the pick cell area 152. Contents of the container are then manipulated in one of the six locations of the first pick cell area 152 before passing to the second pick cell area 153. The inventory then passes on using the conveyor 154 to the second stacker/de-stacker 157 and finally exits the embodiment 150 using the second mobile robot 159.

The embodiment 150 includes two six-location cells and dual stacker/de-stacker areas. The embodiment 150 includes dedicated drop and retrieve points for the mobile robots or external conveyor belt areas.

In summary, as shown above, the system facilitates end-to-end and touchless fulfillment processes. Each embodiment can be expanded with multiple processing stations, as needed, including boxing and packaging stations.

Each cell can accommodate end of arm tools with multiple grippers, as needed. Each end of arm tool can include individually actuated suction cups and other inventory handling devices. The end of arm tools are designed to be compatible with the inventory in the containers received by the pick cell. For example, mechanical grippers are used for non-flexing objects that have a rectangular profile. Vacuum grippers with suction cups are used for inventory with uneven surfaces, ones that are flexible, and ones that have irregular external profiles. Further, in some pick cells, magnetic and adhesive end of arm tools are used.

The system uses highly adaptable individual cells and inventory is handled using a multi-level hierarchy. The system forms an inventory handling solution by coupling cells to control the flow of tray and container traffic. Each cell includes a buffer shelf in one embodiment. The cells are designed to recognize multiple items as needed and then sends the tray away.

In at least some embodiments, the system includes a tray holding area or a waiting area as part of the conveyor, such as the conveyor 154 of FIG. 13D. The tray holding area is not part of any pick cell, but rather forms a place for the trays to remain, while a pick cell requires one of the items from a tray in the tray holding area.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The inention claimed is:

1. A system of inventory management comprising:
   at least one container adapted to hold inventory items;
   warehouse storage having said containers adapted to hold inventory items;
   a conveyor system adapted to move containers with inventory items;
   at least one mobile robot adapted to move said containers from warehouse storage to the conveyor; and
   at least one a pick cell module in communication with said conveyor system comprising an array of processing locations adapted to receive containers and an inventory movement tool comprising a robotic arm adapted to interact with containers received by the pick cell module;
   at least one buffer area defined within one of the at least one pick cells, wherein the buffer area comprises a buffer shelf having sidewalls adapted for temporary storage of inventory within the buffer shelf;
   wherein each container moves on the conveyor system to a pick cell module wherein the inventory items from the container are processed; said buffer shelf in reach of the pick cell robotic arm adapted for temporary storage of items within said pick cell module and wherein pick cell robotic arm controller keeps track of the inventory within the buffer shelf.

2. The system of claim 1 wherein said pick cell module robotic arm retrieves items from received containers transferred to processing locations.

3. The system of claim 2 wherein said inventory movement tool further comprises an additional robotic arm.

4. The system of claim 3 wherein said robotic arm comprises an end of arm tool.

5. The system of claim 4 wherein the system comprises multiple pick cell modules, wherein said pick cell modules use a variety of end of arm tools.

6. The system of claim 5 wherein said inventory items are stored in containers comprising trays, totes, bags, and boxes and wherein a container is routed to a pick cell module with a compatible end of arm tool given the inventory to be retrieved.

7. The system of claim 1 wherein said conveyor system moves containers in and out of pick cell modules to complete orders.

8. The system of claim 1 further comprising a tracking means to track progress of an order being fulfilled by the system.

9. The system of claim 1 wherein said at least one pick cell module comprises a frame and wherein said at least one buffer shelf is attached to said frame.

10. The system of claim 9 further comprising sensors suspended from the pick cell module frame.

11. The system of claim 10 further comprising a controller in communication with said sensors and remaining components of said pick cell module.

12. The system of claim 1 wherein at least one said buffer shelf includes defined sub-areas and wherein dividers define said sub-areas.

13. The system of claim 1 wherein said containers include inventory items having one of several sources.

14. The system of claim 13 wherein said inventory is logically categorized into three hierarchical levels.

15. The system of claim 1 further comprising a container waiting area in communication with said pick cell module wherein inventory containers traverse said conveyor to the container waiting area.

16. The system of claim 1 wherein said conveyor is one-directional.

17. The system of claim 1 comprising multiple buffer shelves within reach of the inventory movement tool.

18. The system of claim 1 wherein said inventory movement tool further comprises a gantry.

* * * * *